(12) United States Patent
Goto et al.

(10) Patent No.: US 11,902,799 B2
(45) Date of Patent: Feb. 13, 2024

(54) STATION PLACEMENT DESIGNING METHOD, STATION PLACEMENT DESIGNING APPARATUS AND STATION PLACEMENT DESIGNING PROGRAM

(71) Applicant: NIPPON TELEGRAPH AND TELEPHONE CORPORATION, Tokyo (JP)

(72) Inventors: Kazuto Goto, Musashino (JP); Hideki Toshinaga, Musashino (JP); Hideyuki Tsuboi, Musashino (JP); Yushi Shirato, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 404 days.

(21) Appl. No.: 17/417,711

(22) PCT Filed: Dec. 12, 2019

(86) PCT No.: PCT/JP2019/048712
§ 371 (c)(1),
(2) Date: Jun. 23, 2021

(87) PCT Pub. No.: WO2020/137586
PCT Pub. Date: Jul. 2, 2020

(65) Prior Publication Data
US 2022/0060906 A1 Feb. 24, 2022

(30) Foreign Application Priority Data
Dec. 26, 2018 (JP) .................... 2018-242831

(51) Int. Cl.
*H04W 16/18* (2009.01)
*H04B 17/318* (2015.01)
*H04B 17/391* (2015.01)

(52) U.S. Cl.
CPC .......... *H04W 16/18* (2013.01); *H04B 17/318* (2015.01); *H04B 17/391* (2015.01)

(58) Field of Classification Search
CPC ... G01S 5/02524; G01S 11/06; H04B 17/391; H04B 17/318; H04W 16/14; H04W 16/18; H04W 64/003
See application file for complete search history.

(56) References Cited

U.S. PATENT DOCUMENTS 10,666,521 B1* 5/2020 Wang .................. H04L 41/12

FOREIGN PATENT DOCUMENTS

JP H08317458 A 11/1996
JP 2010206314 A 9/2010

OTHER PUBLICATIONS

IEEE 802.11 TGayUse Cases, IEEE 802.11-2015/0625r7, Aug. 2017.

* cited by examiner

*Primary Examiner* — Fred A Casca
(74) *Attorney, Agent, or Firm* — Harness, Dickey & Pierce, P.L.C.

(57) ABSTRACT

Point cloud data between a base station device and a terminal station device is acquired as a point cloud data group. A radius of a first Fresnel zone defined by the base station device and the terminal station device at each position where the point cloud data group is acquired is calculated. A region specified by the radius at each position where the point cloud data group is acquired is scanned to detect the point cloud data, and a non-line-of-sight region is extracted. A ratio of a total area of all the extracted non- (Continued)

line-of-sight regions to an area of a region constructed by the first Fresnel zone is calculated. A received power is estimated based on the calculated ratio between the areas. Whether or not there is a line of sight between the base station device and the terminal station device is determined based on the received power.

8 Claims, 16 Drawing Sheets

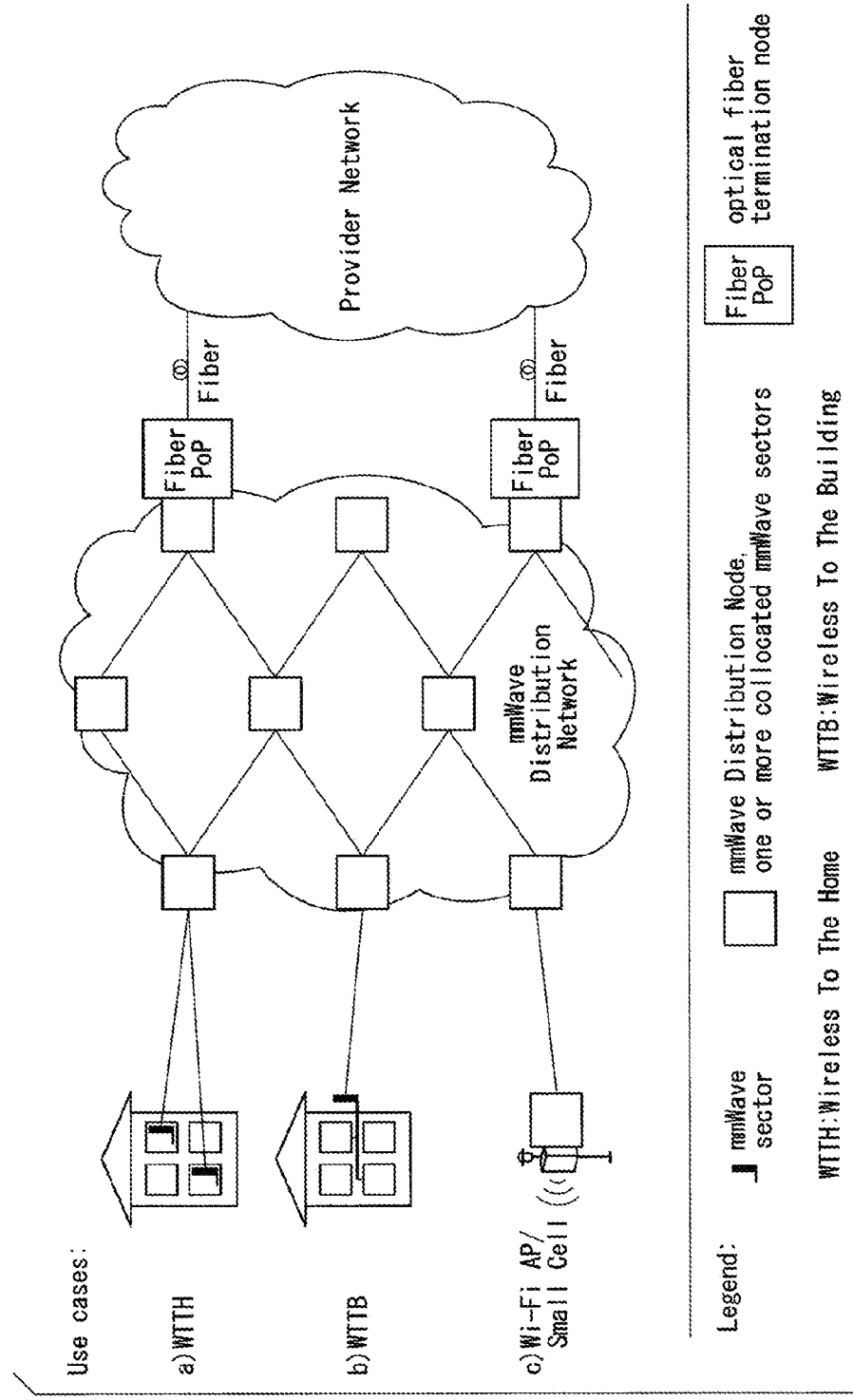

STATION PLACEMENT DESIGNING METHOD, STATION PLACEMENT DESIGNING APPARATUS AND STATION PLACEMENT DESIGNING PROGRAM

CROSS-REFERENCE TO RELATED APPLICATIONS

This application is a 371 U.S. National Phase of International Application No. PCT/JP2019/048712 filed on Dec. 12, 2019, which claims priority to Japanese Application No. 2018-242831 filed on Dec. 26, 2018. The entire disclosures of the above applications are incorporated herein by reference.

TECHNICAL FIELD

The present invention relates to a station installation design method, a station installation design device, and a station installation design program.

BACKGROUND ART

Currently, IEEE 802.1lay is being discussed as a next-generation 60 GHz band wireless LAN (Local Area Network) standard. As described in NPL 1, various usage models are being studied in IEEE 802.11ay, and a model added in July 2017 is the "millimeter-wave distribution network" (mmWave Distribution Network).

FIG. 16 is a diagram illustrating a configuration of a millimeter-wave distribution network extracted from NPL 1. The millimeter-wave distribution network is a usage model for constructing a relay network that replaces optical fibers with millimeter waves. In the millimeter-wave distribution network, a millimeter-wave distribution node (mmWave Distribution Node; equivalent to a base station device installed in a base station) installed outdoors and a radio terminal (mmWave Sector; a terminal station device installed in a terminal station) installed in a building are connected to each other. Further, in the millimeter-wave distribution network, the millimeter-wave distribution node and the radio terminal are fixedly installed.

In order to operate a wireless communication system, it is necessary to provide a user with a sufficient wireless communication environment, which requires a station installation design to install a base station or a terminal station at an appropriate position. A mobile wireless communication system, which is typified by that for mobile phones, needs to a station installation design in consideration of the movement of a terminal station and the use of ultra-high frequency waves whose radio waves are diffracted.

For example, PTL 1 proposes an example of a station installation design method in consideration of base station cooperation communication in a cellular mobile communication system. The station installation design support device disclosed in PTL 1 has, for example, the configuration illustrated in FIG. 1 of PTL 1. Also, PTL 1 describes the following procedure. (1) Determine a regional base station, cooperative base stations, and non-cooperative base stations for each section of the target area for the station installation design, based on the arrangement of the base stations in the area and the radio wave propagation environment of each base station. (2) Determine a communication method of base station cooperation communication for each section of the area based on the assumed radio wave conditions between the regional base station, the cooperative base stations, and the non-cooperative base stations. (3) Calculate assumed radio characteristics for each section of the area based on the communication method of the base station cooperation communication.

In PTL 1, as described above, a means for knowing the radio wave propagation environment is required. PTL 2 proposes an example of the means for knowing the radio wave propagation environment, which is required in the technique disclosed in PTL 1. In PTL 2, as illustrated in the flowchart of FIG. 1 of PTL 2, a procedure for creating data for determining an installation pattern of a PHS (Personal Handy-phone System) base station is described. To summarize this procedure, the procedure is as follows. (1) Prepare a plurality of different installation patterns of a PHS base station for a predetermined service planning area, and perform a simulation of the electric field strength distribution for each installation pattern. (2) Calculate a ratio of the area of a communicable area to the area of the service area planning area as a quality evaluation value for each installation pattern, and also calculate a cost evaluation value, based on the simulation result. (3) Determine the installation pattern for the service area plan based on the quality evaluation value and the cost evaluation value.

CITATION LIST

Patent Literature

[PTL 1] Japanese Patent Application Publication No. 2010-206314
[PTL 2] Japanese Patent Application Publication No. H08-317458
[Non Patent Literature]
  [NPL 1] "IEEE 802.11 TGay Use Cases", IEEE 802.11-2015/0625r7, August 2017

SUMMARY OF THE INVENTION

Technical Problem

As described above, in the station installation design method for the mobile wireless communication system, it is necessary to take into consideration the movement of the terminal station and the diffraction of the radio waves, which in turn needs to know the radio wave propagation environment in a wide area. Then, in order to know the radio wave propagation environment, it is also necessary to perform a simulation such as a ray tracing method. However, it is known that such a simulation requires a huge amount of calculation.

On the other hand, a millimeter-wave wireless communication system, which is typified by the millimeter-wave distribution network described above, has features that both the base station and the terminal station are installed at fixed positions and millimeter waves are used in which the diffraction of radio waves hardly occurs. Thus, in the case of a millimeter-wave wireless communication system, a method can be applied that is different from the station installation design method applied to the mobile wireless communication system. Therefore, in a millimeter-wave wireless communication system, there is a need for a station installation design method that does not require a huge amount of calculation to know the radio wave propagation environment as in a mobile wireless system.

In view of the foregoing, an object of the present invention is to provide a technique capable of reducing the amount of calculation in a millimeter-wave wireless communication system.

Means for Solving the Problem

One aspect of the present invention is a station installation design method including a point cloud data acquisition step of acquiring point cloud data between a base station device and a terminal station device as a point cloud data group; a Fresnel zone radius calculation step of calculating a radius of a first Fresnel zone defined by the base station device and the terminal station device at each position where the point cloud data group is acquired; a non-line-of-sight region extraction step of scanning a region specified by the radius at each position where the point cloud data group is acquired to detect the point cloud data, and extracting a non-line-of-sight region; an area ratio calculation step of calculating a ratio of a total area of all the extracted non-line-of-sight regions to an area of a region constructed by the first Fresnel zone; a received power estimation step of estimating a received power based on the calculated ratio between the areas; and a line-of-sight determination step of determining based on the received power whether or not there is a line of sight between the base station device and the terminal station device.

In one aspect of the present invention according to the station installation design method, the non-line-of-sight region extraction step includes, when extracting the non-line-of-sight region at the position where the point cloud data group is acquired, scanning a remaining region in which the region corresponding to the non-line-of-sight region already extracted at another position is excluded from the region specified by the radius corresponding to the position where the point cloud data group is acquired to detect the point cloud data, and extracting the non-line-of-sight region.

One aspect of the present invention according to the station installation design method includes a base station installation candidate position acquisition step of acquiring information on base station installation candidate positions each indicating a candidate for a position where the base station device is to be installed; and performs, for each of the base station installation candidate positions, the point cloud data acquisition step, the Fresnel zone radius calculation step, the non-line-of-sight region extraction step, the area ratio calculation step, the received power estimation step, and the line-of-sight determination step, and the method includes a selection step of setting as a base station installable position the base station installation candidate position for which it is determined that there is a line of sight, and selecting a base station installation position from among the base station installable positions, based on information about terminal stations associated with the base station installable positions.

One aspect of the present invention according to the station installation design method includes a received power comparison step of, when the line-of-sight determination step determines that there is a line of sight, determining whether or not the base station device can be installed based on the received power and a predetermined allowable maximum received power.

One aspect of the present invention according to the station installation design method includes a structural deterioration status determination step of, when the line-of-sight determination step determines that there is a line of sight, acquiring the point cloud data at the position where the base station device is to be installed, and determining based on the acquired point cloud data whether or not a structure at the position where the base station device is to be installed is deteriorated.

One aspect of the present invention is a station installation design device including a point cloud data acquisition unit that acquires point cloud data between a base station device and a terminal station device as a point cloud data group; a Fresnel zone radius calculation unit that calculates a radius of a first Fresnel zone defined by the base station device and the terminal station device at each position where the point cloud data group is acquired; a non-line-of-sight region extraction unit that scans a region specified by the radius at each position where the point cloud data group is acquired to detect the point cloud data, and extracts a non-line-of-sight region; an area ratio calculation unit that calculates a ratio of a total area of all the extracted non-line-of-sight regions to an area of a region constructed by the first Fresnel zone; a received power estimation unit that estimates a received power based on the calculated ratio between the areas; and a line-of-sight determination unit that determines based on the received power whether or not there is a line of sight between the base station device and the terminal station device.

In one aspect of the present invention according to the station installation design device, when the non-line-of-sight region extraction unit extracts the non-line-of-sight region at the position where the point cloud data group is acquired, the non-line-of-sight region extraction unit scans a remaining region in which the region corresponding to the non-line-of-sight region already extracted at another position is excluded from the region specified by the radius corresponding to the position where the point cloud data group is acquired to detect the point cloud data, and extracts the non-line-of-sight region.

One aspect of the present invention is a station installation design program for causing a computer to execute each step of the station installation design method.

Effects of the Invention

According to the present invention, it is possible to reduce the amount of calculation in a millimeter-wave wireless communication system.

BRIEF DESCRIPTION OF DRAWINGS

FIG. 16 is a diagram illustrating a configuration of a millimeter-wave distribution network extracted from NPL 1.

DESCRIPTION OF EMBODIMENTS

First Embodiment

Hereinafter, embodiments of the present invention will be described with reference to the drawings.

Figure 1:
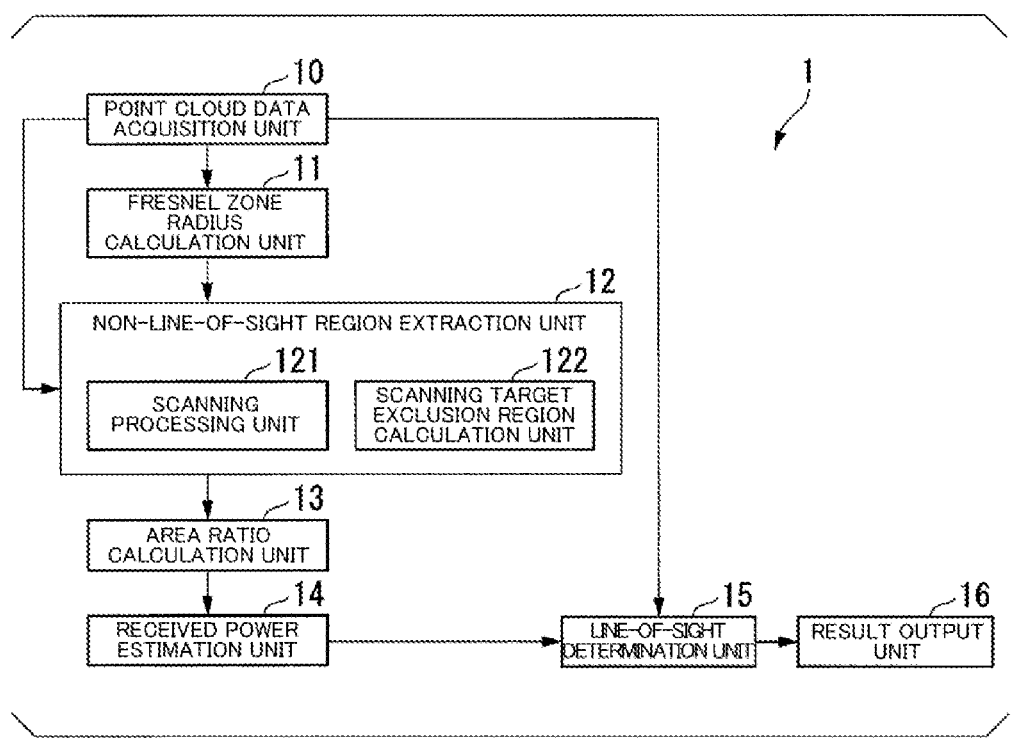
FIG. 1 is a block diagram illustrating a configuration of a station installation design device according to a first embodiment.

FIG. 1 is a block diagram illustrating a configuration of a station installation design device 1 according to a first embodiment. The station installation design device 1 according to the first embodiment performs station installation design for the above-described millimeter-wave wireless communication system, which is assumed here.

Figure 2:
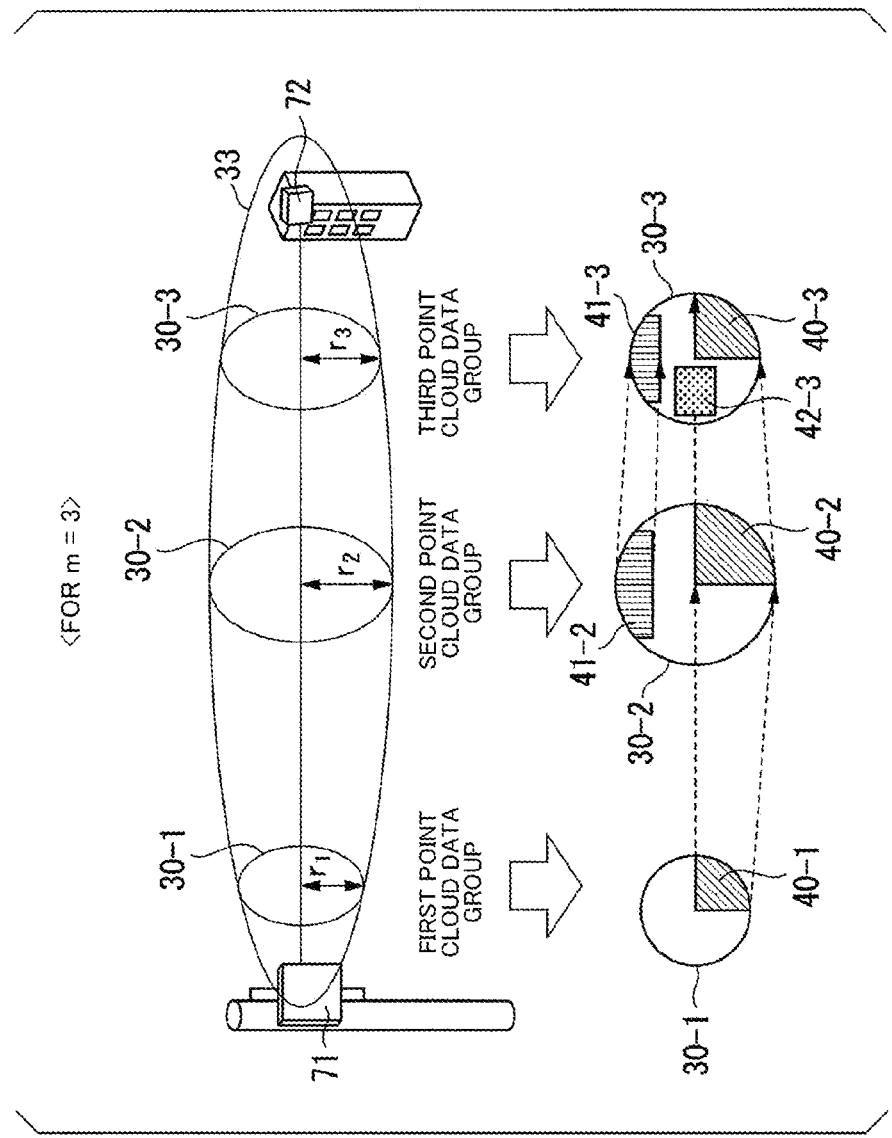
FIG. 2 is a diagram for explaining processing of extracting a non-line-of-sight region in the first embodiment.

As illustrated in FIG. 2, in the millimeter-wave wireless communication system, for example, a base station device 71 is fixedly installed on a post such as a utility pole or other pole, and a terminal station device 72 is fixedly installed on a structure such as a house or a building. Note that the places where the base station device 71 and the terminal station device 72 are installed correspond to a base station and a terminal station, respectively, and in each of the following embodiments, it is assumed that one base station device 71 is installed in one base station, and one terminal station device 72 is installed in one terminal station.

Further, in the first embodiment, the position of the terminal station device 72 is determined in advance, and the installation position of the base station device 71 is freely selected by, for example, the user of the station installation design device 1. The station installation design device 1 determines whether or not the freely selected installation position of the base station device 71 is appropriate for the position of the terminal station device 72, and presents the determination.

The station installation design device 1 according to the first embodiment performs station installation design using point cloud data. Here, the point cloud data is a set of points with high-density that can be acquired by using, for example, MMS (Mobile Mapping System), which is an in-vehicle laser measurement system equipped with a positioning sensor, a laser scanner, and the like. Each of the points included in a point cloud has an xyz value. Analyzing the point cloud data makes it possible to know the position and shape of an object. For example, the following reference introduces a technique for extracting road edges, poles, and signs from point cloud data acquired using an MMS.

[Reference Document] Katsuyoshi Tokoro, Shizuo Manabe, Ikuo Kitagawa, Toshiaki Sato, "Detecting Road Edge, Pole, Plate Sign from MMS 3D Point Cloud", Proceedings of the 2016 Semestrial Meeting of the Japan Society for Precision Engineering, Precision Engineering Society, March 2016, pp. 777-778

As illustrated in FIG. 1, the station installation design device 1 includes a point cloud data acquisition unit 10, a Fresnel zone radius calculation unit 11, a non-line-of-sight region extraction unit 12, an area ratio calculation unit 13, a received power estimation unit 14, a line-of-sight determination unit 15, and a result output unit 16.

The point cloud data acquisition unit 10 acquires point cloud data in a target section from an MMS or the like. Here, the target section is, for example, a section between the base station device 71 and the terminal station device 72 illustrated in FIG. 2. The point cloud data acquired by the point cloud data acquisition unit 10 belongs to a group of point cloud data sets (hereinafter, referred to as a "point cloud data group") that has a shape like a slice cut at a position where a shield is present in the target section. The point cloud data acquisition unit 10 groups the acquired point cloud data sets into point cloud data groups, so that for example data sets in a certain range belongs to each group, and detects the number of point cloud data groups. Note that the point cloud data group is referred to as "group", but one point cloud data group may include one or more point cloud data sets. Further, in the following description, the number of point cloud data groups acquired by the point cloud data acquisition unit 10 is represented by "m".

Figure 3:
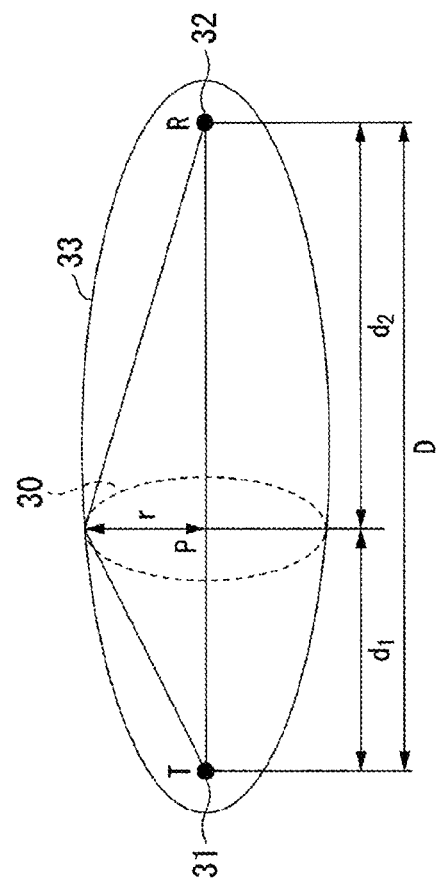
FIG. 3 is a diagram illustrating how to calculate a radius of a first Fresnel zone in the first embodiment.

The Fresnel zone radius calculation unit 11 calculates, based on the first Fresnel zone between the base station device 71 and the terminal station device 72, the radius of a cross section of the first Fresnel zone at the position where the point cloud data acquisition unit 10 has acquired the point cloud data group. For example, as illustrated in FIG. 3, suppose that the base station device 71 is installed at a transmission point 31 and the terminal station device 72 is installed at a reception point 32. Note that the positions of the base station device 71 and the terminal station device 72 may be reversed.

In this case, an ellipsoidal first Fresnel zone 33 is defined for the transmission point 31 and the reception point 32. In the first Fresnel zone 33, a circular cross section can be defined that intersects the straight line connecting the transmission point 31 and the reception point 32 at a right angle at a position on the straight line connecting the transmission point 31 and the reception point 32.

Now suppose that a point cloud data group output by the point cloud data acquisition unit 10 is the point cloud data group acquired on a plane including a cross section 30 at a position P. In this case, the Fresnel zone radius calculation unit 11 calculates the radius r of the cross section 30 of the first Fresnel zone 33 at the position P by the following Formula (1).

[Math. 1]

$$r \cong \sqrt{\lambda \frac{d_1 d_2}{d_1 + d_2}} \quad (1)$$

In Formula (1), λ is the wavelength of radio waves, di is the distance from the transmission point 31 to the position P, and $d_2$ is the distance from the position P to the reception point 32. Note that, in the following description, the radius corresponding to the k-th point cloud data group is represented as a radius rk. Here, k is an integer from 1 to m.

The non-line-of-sight region extraction unit 12 includes a scanning processing unit 121 and a scanning target exclusion region calculation unit 122. The scanning processing unit 121 sets a region specified by the radius of each position where the point cloud data group calculated by the Fresnel zone radius calculation unit 11 is present, as a scanning target region. Also, when any non-line-of-sight region is not extracted at other position(s), the scanning processing unit 121 sets the entire scanning target region as the scanning region.

Also, when any non-line-of-sight region has been already extracted at other position(s), the scanning processing unit 121 excludes an exclusion region calculated by the scanning target exclusion region calculation unit 122 from the scanning target area, and sets the remaining region after the exclusion as the scanning region. The scanning processing unit 121 extracts a non-line-of-sight region by scanning and detecting the point clouds present in the scanning region. Also, the scanning processing unit 121 outputs information on all the non-line-of-sight regions extracted at the respective positions to the area ratio calculation unit 13.

In the example illustrated in FIG. 2, the point cloud data acquisition unit 10 has acquired m=3, that is, three point cloud data groups. The Fresnel zone radius calculation unit 11 calculates, for example, the radius of the first Fresnel zone 33 of a point cloud data group m=1 as a radius $r_1$. A region 30-1 specified by the calculated radius $r_1$ is the scanning region. The scanning processing unit 21 cans the point clouds in the scanning region and extracts a fan-shaped region 40-1 in which point clouds are present as a non-line-of-sight region at m=1.

The scanning target exclusion region calculation unit 122 enlarges or reduces all the non-line-of-sight regions already extracted by the scanning processing unit 121 at other positions to a size corresponding to the radius r corresponding to the next scanning target position, to calculate an exclusion region. Also, the scanning target exclusion region calculation unit 122 outputs information on the calculated exclusion region to the scanning processing unit 121.

In other words, the non-line-of-sight region extraction unit 12 set, as the scanning region, a region obtained by removing the non-line-of-sight region detected by scanning the k-th point cloud data group from the (k+1)-th and subsequent scanning target regions, and then scans the point clouds. Also in other words, the non-line-of-sight region extraction unit 12 sets, as the exclusion region, the newly detected non-line-of-sight region at the previous position and the region already excluded from the scanning target region, excludes the exclusion region from the scanning region, and then scans the point clouds.

For example, in the example illustrated in FIG. 2, suppose that the radius of the first Fresnel zone 33 for m=2 calculated by the Fresnel zone radius calculation unit 11 is $r_2$. The scanning target exclusion region calculation unit 122 calculates a ratio between the radius $r_1$ and the radius $r_2$. Since the radius $r_2$ is larger than the radius $r_1$, the scanning target exclusion region calculation unit 122 enlarges the size of the region 40-1 by the calculated ratio, and sets the resulting region as a region 40-2. The scanning target exclusion region calculation unit 122 outputs the region 40-2 to the scanning processing unit 121 as an exclusion region.

The scanning processing unit 121 sets, as the scanning region, a region in which the region 40-2 is excluded from a region 30-2 specified by the radius $r_2$, scans the point clouds in the resulting region, and extracts a region 41-2 having a rectangular shape with rounded top edge in which point clouds are present as a non-line-of-sight region. The scanning processing unit 121 collectively sets the extracted region 41-2 and the excluded region 40-2 as a non-line-of-sight region for m=2.

Similarly, suppose that the radius of the first Fresnel zone 33 for m=3 calculated by the Fresnel zone radius calculation unit 11 is $r_3$. The scanning target exclusion region calculation unit 122 calculates a ratio between the radius $r_2$ and the radius $r_3$. Since the radius $r_3$ is smaller than the radius $r_2$, the scanning target exclusion region calculation unit 122 reduces the size of the non-line-of-sight region for m=2, that is, the sizes of the region 40-2 and the region 41-2 by the calculated ratio, and sets the resulting regions as a region 40-3 and a region 41-3, respectively. The scanning target exclusion region calculation unit 122 outputs the region 40-3 and the region 41-3 to the scanning processing unit 121 as exclusion regions.

The scanning processing unit 121 sets, as the scanning region, a region in which the region 40-3 and the region 41-3 are excluded from a region 30-3 specified by the radius $r_3$, scans the point clouds in the resulting region, and extracts a region 42-3 having a rectangular shape in which point clouds are present as a non-line-of-sight region. The scanning processing unit 121 collectively sets the extracted region 42-3, the region 40-3, and the region 41-3 as non-line-of-sight regions for m=3.

The area ratio calculation unit 13 calculates an area ratio of the total area of all the non-line-of-sight regions extracted by the non-line-of-sight region extraction unit 12 to the area of a region constructed by the first Fresnel zone 33. Here, the area of the region constructed by the first Fresnel zone 33 is, for example, the area of a region specified by a radius $r_m$ of the first Fresnel zone 33 at the position of the m-th point cloud data group, that is, the position of the last point cloud data group. In the example illustrated in FIG. 3, when m=3 is for the last point cloud data group, the area ratio calculation unit 13 calculates a ratio of the total area of the regions 40-3, 41-3, and 42-3, which are non-line-of-sight regions, to the area of the region 30-3 constructed by the first Fresnel zone 33.

The received power estimation unit 14 estimates a received power from the area ratio calculated by the area ratio calculation unit 13. The line-of-sight determination unit 15 determines whether or not there is a line of sight based on the received power estimated by the received power estimation unit 14. The result output unit 16 outputs information indicating whether or not the base station can be installed based on the determination result of the line-of-sight determination unit 15.

Station Installation Design Method in Station Installation Design Device According to First Embodiment Next, processing of a station installation design method in the station installation design device 1 according to the first embodiment will be described with reference to FIGS. 4 to 9.

Figure 4:
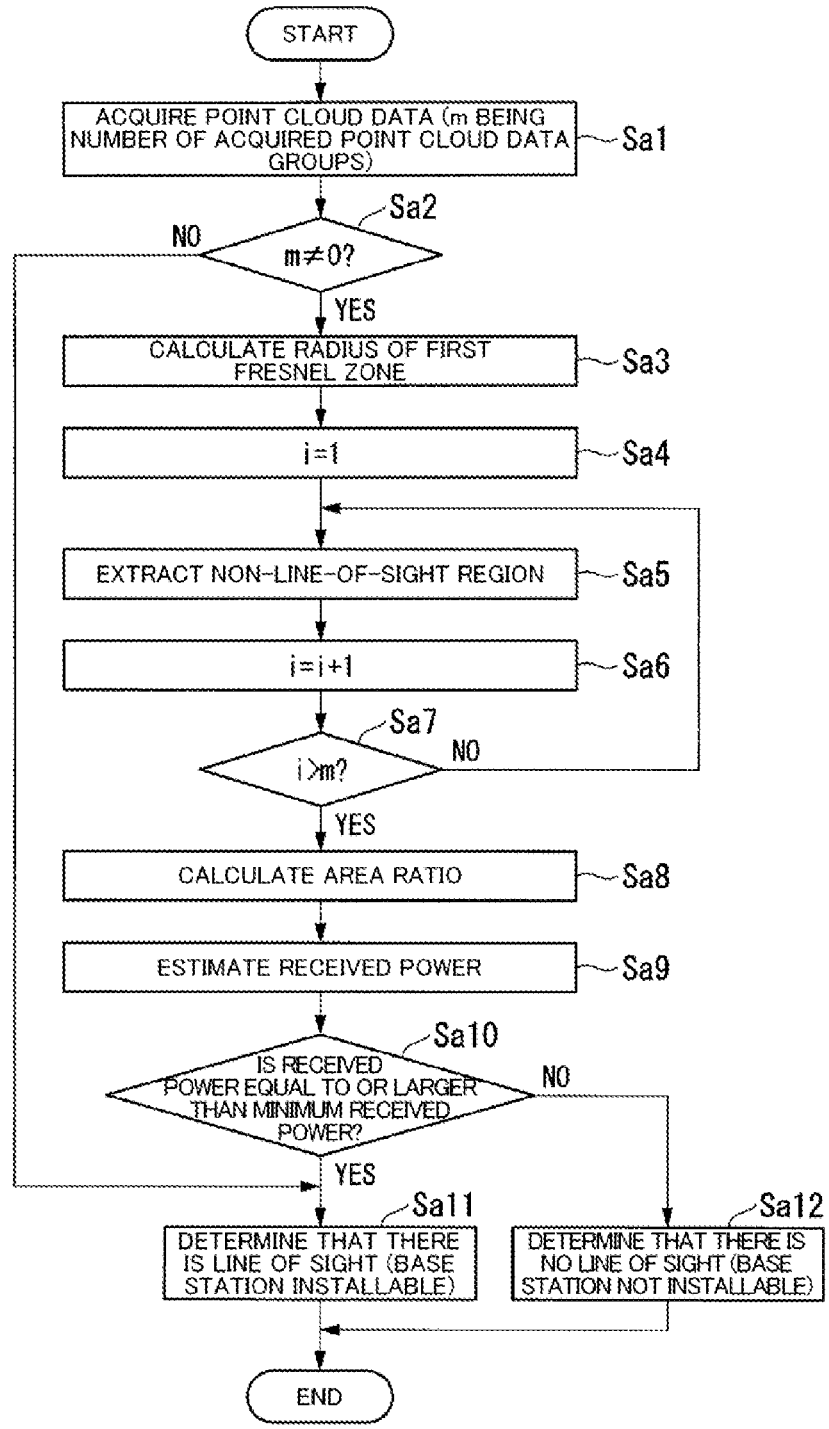
FIG. 4 is a flowchart illustrating a processing flow of a station installation design method according to the first embodiment.

FIG. 4 is a flowchart illustrating a processing flow of the station installation design method in the station installation design device 1. It is assumed that before the processing of FIG. 4 is started, position information indicating the position of the base station device 71 and position information indicating the position of the terminal station device 72 are given to the station installation design device 1.

Figure 5:
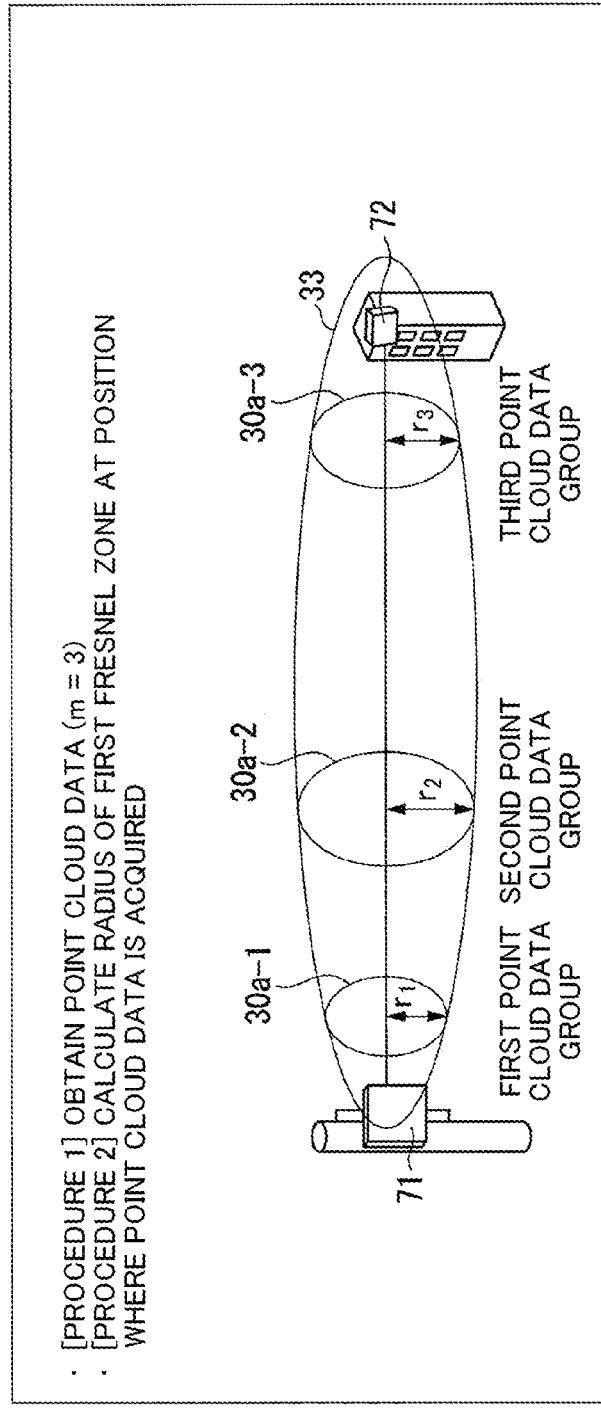
FIG. 5 is a diagram (Part 1) illustrating a processing outline of the station installation design method according to the first embodiment.

The point cloud data acquisition unit 10 acquires point cloud data of the target section from, for example, an MMS (step Sa1, Procedure 1 in FIG. 5). The point cloud data acquisition unit 10 groups the acquired point cloud data into a number of point cloud data groups. The point cloud data acquisition unit 10 detects the number of point cloud data groups "m", and determines whether the detected number of point cloud data groups "m" is not "0" (step Sa2).

When the point cloud data acquisition unit 10 determines that the detected number of point cloud data groups "m" is "0" (step Sa2, No), the point cloud data acquisition unit 10 outputs information of "m=0" to the line-of-sight determination unit 15. When the line-of-sight determination unit 15 receives the information of "m=0" from the point cloud data acquisition unit 10, the line-of-sight determination unit 15 determines that there is a line of sight because there is no shield in the target section. In response to receiving the determination result from the line-of-sight determination unit 15, the result output unit 16 outputs information indicating that the base station can be installed (step Sa11), and then the processing ends.

On the other hand, when the point cloud data acquisition unit 10 determines that the detected number of point cloud data groups "m" is not "0" (step Sa2, Yes), the point cloud data acquisition unit 10 outputs the point cloud data groups to the Fresnel zone radius calculation unit 11 and the non-line-of-sight region extraction unit 12.

In the example illustrated in FIG. 5, since the point cloud data acquisition unit 10 detects three point cloud data groups (m=3), the processing proceeds to step Sa3. The Fresnel zone radius calculation unit 11 calculates a radius $r_k$ of the first Fresnel zone 33 for each position of the point cloud data groups based on the above Formula (1).

The Fresnel zone radius calculation unit 11 outputs all the calculated radiuses rk to the non-line-of-sight region extraction unit 12 (step Sa3, Procedure 2 in FIG. 5). In the example illustrated in FIG. 5, the Fresnel zone radius calculation unit 11 calculates the radius $r_1$ for m=1, the radius $r_2$ for m=2, and the radius $r_3$ for m=3, and outputs the calculated radius $r_1$, radius $r_2$, and radius $r_3$ to the non-line-of-sight region extraction unit 12. Note that, the subscript "k" in the radius rk is merely a subscript indicating the order, and the lengths of the radius $r_1$, the radius $r_2$, and the radius $r_3$ that are illustrated in FIG. 5 have different values from the lengths of the radius $r_1$, the radius $r_2$, and the radius $r_3$ that are illustrated in FIG. 2, respectively.

The scanning processing unit 121 of the non-line-of-sight region extraction unit 12 sets "1" to an internal counter "i" (step Sa4). The non-line-of-sight region extraction unit 12 extracts the non-line-of-sight region by scanning the i-th point cloud data group in the i-th scanning region. At this time, the non-line-of-sight region extraction unit 12 sets, as the scanning region, a region obtained by removing the non-line-of-sight region detected by scanning the i-th point cloud data group from the (i+1)-th and subsequent scanning target regions, and then scans the point clouds in the scanning region (step Sa).

The scanning processing unit 121 sets a value obtained by adding "1" to the counter "i" to "i" (step Sa6). The scanning processing unit 121 determines whether or not i is larger than m (step Sa7). When the scanning processing unit 121 determines that i is equal to or smaller than m, the scanning processing unit 121 performs the processing of step Sa5 again (step Sa7, No). As a result, the processing in the non-line-of-sight region extraction unit 12 is repeated the number of point cloud data groups, that is, "m" times. On the other hand, when the scanning processing unit 121 determines that i is larger than m, the scanning processing unit 121 outputs information on all the extracted non-line-of-sight regions to the area ratio calculation unit 13.

Figure 6:
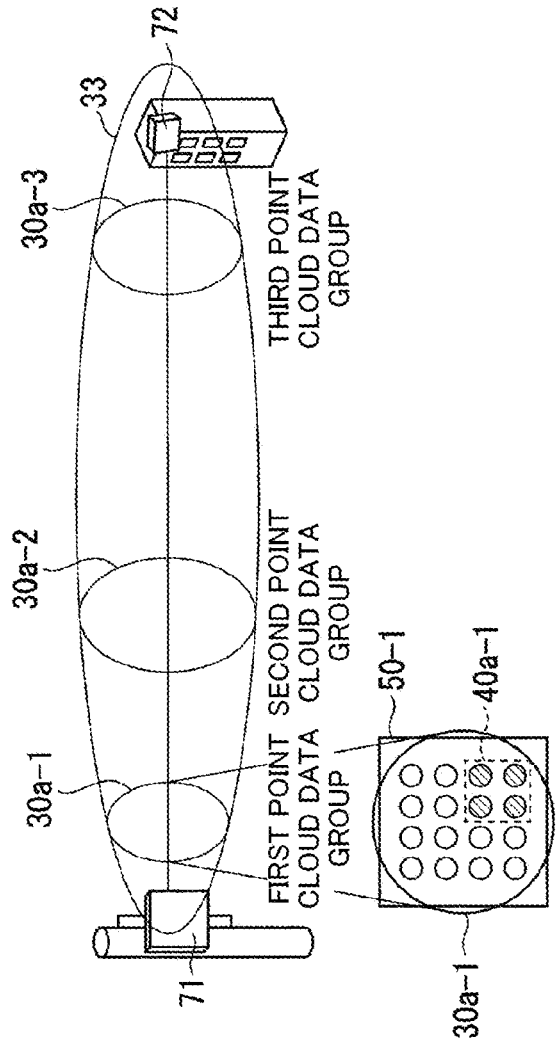
FIG. 6 is a diagram (Part 2) illustrating the processing outline of the station installation design method according to the first embodiment.

The processing of step Sa5 will be specifically described with reference to FIGS. 6 to 8. The processing of step Sa5 differs depending on the value of "i". When "i" illustrated in FIG. 6 is "1", the scanning processing unit 121 selects a circular region 30*a*-1 specified by the radius $r_1$ in the first Fresnel zone 33. In the example illustrated in FIG. 6, unlike the example illustrated in FIG. 2, more specifically, for example, it is assumed that the point cloud data acquisition unit 10 has acquired the point clouds arranged in a grid pattern at regular intervals. In this case, the scanning processing unit 121 does not use the circular region 30*a*-1 as the scanning region as it is, but specifies a rectangular region defined based on the interval in the point cloud and the size of the region 30*a*-1 as a scanning region 50-1. The scanning processing unit 121 scans the point clouds in the scanning region 50-1, and extracts a region 40*a*-1 including four point clouds as a non-line-of-sight region (Procedure 3-1 in FIG. 6).

Figure 7:
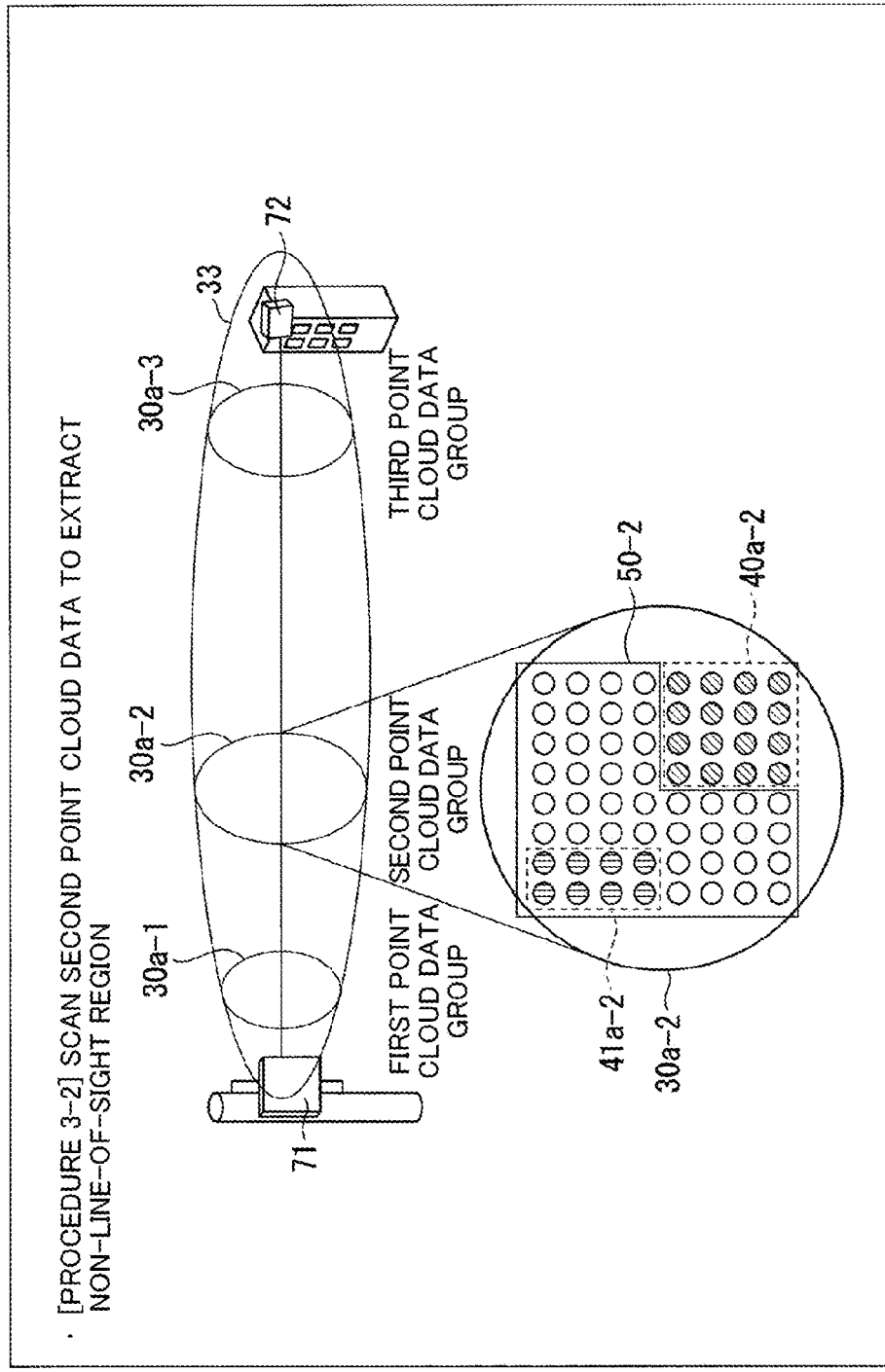
FIG. 7 is a diagram (Part 3) illustrating the processing outline of the station installation design method according to the first embodiment.
Figure 8:
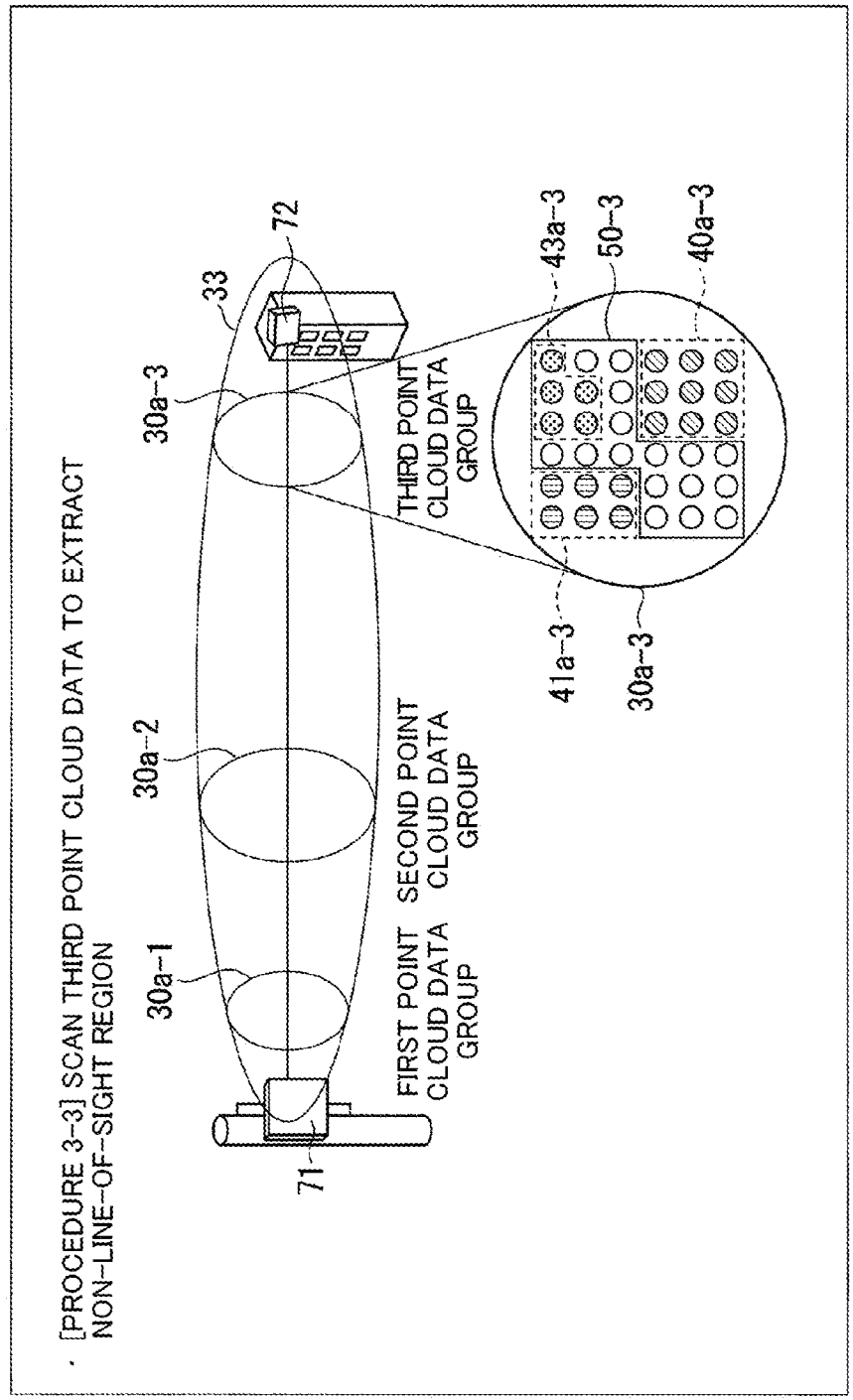
FIG. 8 is a diagram (Part 4) illustrating the processing outline of the station installation design method according to the first embodiment.

On the other hand, when "i" illustrated in FIGS. 7 and 8 is "2" or more, the scanning processing unit 121 outputs to the scanning target exclusion region calculation unit 122 an exclusion region calculation request including information on the (i−1)-th newly extracted non-line-of-sight region, and the radius $r_{i1}$ and the radius $r_i$. Note that since the scanning target exclusion region calculation unit 122 stores the information included in all the exclusion region calculation requests received from the scanning processing unit 121 in its internal storage area, the scanning target exclusion region calculation unit 122 has information on the (i−1)-th and previous non-line-of-sight regions and radiuses.

When the scanning target exclusion region calculation unit 122 receives the exclusion region calculation request from the scanning processing unit 121, the scanning target exclusion region calculation unit 122 enlarges or reduces all of the (i−1)-th and previous non-line-of-sight regions extracted by the scanning processing unit 121 to the size depending on the radius $r_i$ included in the exclusion region calculation request, to calculate an exclusion region.

The scanning target exclusion region calculation unit 122 outputs information on the calculated exclusion region to the scanning processing unit 121.

For example, for i=2 illustrated in FIG. 7, the scanning processing unit 121 outputs to the scanning target exclusion region calculation unit 122 an exclusion region calculation request including information on a region 40*a*-1 which is the first non-line-of-sight region, and the radius $r_1$ and the radius $r_2$. The scanning target exclusion region calculation unit 122 calculates a ratio between the radius $r_1$ and the radius $r_2$. Since the radius $r_2$ is twice as large as the radius $r_1$, the scanning target exclusion region calculation unit 122 enlarges the region 40*a*-1 to four times of its size to calculate a region 40*a*-2 including 16 point clouds as an exclusion region. The scanning target exclusion region calculation unit 122 outputs the region 40*a*-2 to the scanning processing unit 121 as the exclusion region.

The scanning processing unit 121 receives the information on the region 40*a*-2 output by the scanning target exclusion region calculation unit 122, and sets as a scanning region 50-2 a region in which the region 40*a*-2 is excluded from the next rectangular scanning target region specified by the radius $r_2$. The scanning processing unit 121 scans the point clouds in the scanning region 50-2, and extracts a region 41a-2 including eight point clouds as a non-line-of-sight region (Procedure 3-2 in FIG. 7).

For i=3 illustrated in FIG. 8, the scanning processing unit 121 outputs to the scanning target exclusion region calculation unit 122 an exclusion region calculation request including information on the region 41a-2 which is the non-line-of-sight region newly extracted for I=2, and the radius $r_2$ and the radius $r_3$. The scanning target exclusion region calculation unit 122 calculates a ratio between the radius $r_2$ and the radius $r_3$. Since the radius $r_3$ is ¾ times as large as the radius $r_2$, the scanning target exclusion region calculation unit 122 reduces the region 41a-2 to 9/16 times of its original size to calculate a region 41a-3 as an exclusion region (Procedure 3-3 in FIG. 8).

Note that when the region 41a-2 is reduced to 9/16 times of its size, 4 points in the vertical direction is reduced to 3 points, while 2 points in the horizontal direction is reduced to 1.5 points, and however, the 2 points in the horizontal direction remains unchanged to avoid such a decimal point.

Further, the scanning target exclusion region calculation unit 122 reduces the region 40a-2 to 9/16 times of its size to calculate a region 40a-3 including nine point clouds as an exclusion region. The scanning target exclusion region calculation unit 122 outputs the calculated region 40a-3 and region 41a-3 to the scanning processing unit 121 as the exclusion regions.

The scanning processing unit 121 receives the information on the region 40a-3 and the region 41a-3 output by the scanning target exclusion region calculation unit 122, and sets as a scanning region 50-3 a region in which the region 40a-3 and the region 41a-3 is excluded from the next rectangular scanning target region specified by the radius $r_3$. The scanning processing unit 121 scans the point clouds in the scanning region 50-3, and extracts a region 43a-3 including five point clouds as a non-line-of-sight region.

Figure 9:
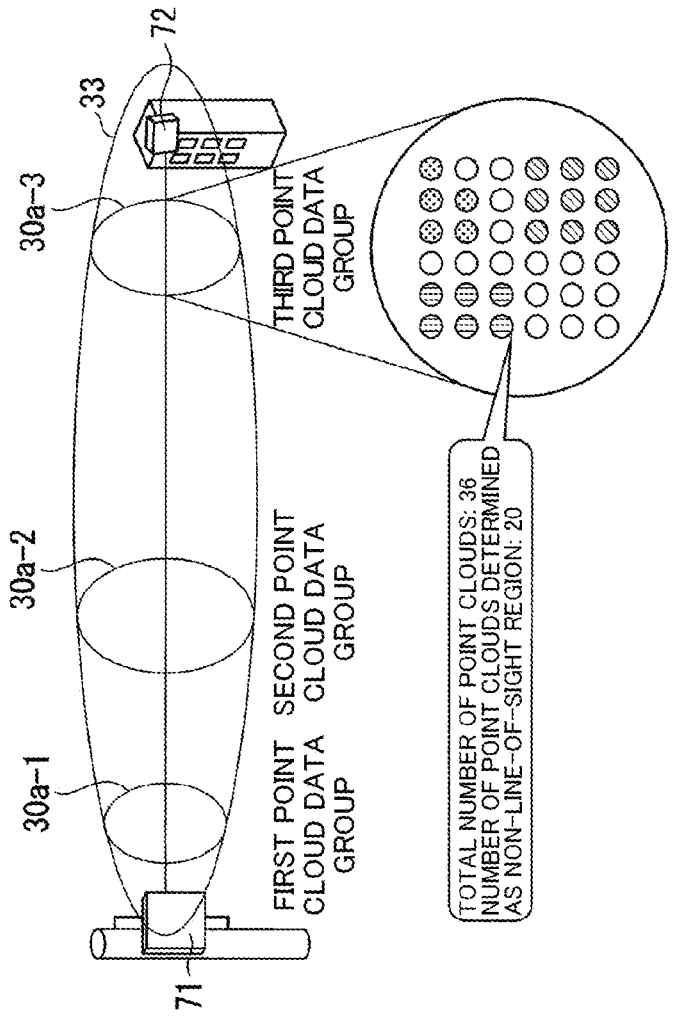
FIG. 9 is a diagram (Part 5) illustrating the processing outline of the station installation design method according to the first embodiment.

The area ratio calculation unit 13 calculates an area ratio of the total area of all the non-line-of-sight regions extracted by the non-line-of-sight region extraction unit 12 to the area of a region constructed by the first Fresnel zone 33 (step Sa8, Procedure 4 in FIG. 9). In other words, the area ratio calculation unit 13 calculates the number of point clouds in the non-line-of-sight region as determined at the position of the m-th point cloud data group output by the non-line-of-sight region extraction unit 12, as a total area of the non-line-of-sight regions. Also, the area ratio calculation unit 13 calculates a total number of point clouds included in the rectangular region specified by the radius $r_m$ of the first Fresnel zone 33 at the position of the m-th point cloud data group, as the area of a region constructed by the first Fresnel zone 33. The area ratio calculation unit 13 calculates an area ratio by dividing the number of point clouds determined as non-line-of-sight regions by the total number of point clouds.

As illustrated in FIG. 9, the number of point clouds in the non-line-of-sight region as determined at the position of the last/third point cloud data group is 20, and the total number of point clouds is 36, so that the area ratio calculated by the area ratio calculation unit 13 is "0.56".

The received power estimation unit 14 performs an operation of estimating a received power from the area ratio calculated by the area ratio calculation unit 13 (step Sag, Procedure 5 in FIG. 9). The received power estimation unit 14 calculates the received power by combining a method of estimating a shielding loss from the ratio of a shielding area to the first Fresnel zone 33 and a propagation loss model.

The line-of-sight determination unit 15 compares the received power estimated by the received power estimation unit 14 with a specified minimum received power, which is a predetermined threshold value, and determines whether or not the received power is equal to or higher than the threshold value (step Sa10, Procedure 6 in FIG. 9). When the line-of-sight determination unit 15 determines that the received power is equal to or higher than the threshold value (step Sa10, Yes), the result output unit 16 outputs information indicating that there is a line of sight, that is, that a base station can be installed (step Sa11). On the other hand, when the line-of-sight determination unit 15 determines that the received power is not equal to or higher than the threshold value (step Sa10, No), the result output unit 16 outputs information indicating that there is no line of sight, that is, that any base station cannot be installed (step Sa12).

In the station installation design device 1 according to the first embodiment described above, the point cloud data acquisition unit 10 acquires point cloud data between the base station device 71 and the terminal station device 72 as a point cloud data group. The Fresnel zone radius calculation unit 11 calculates a radius of the first Fresnel zone 33 defined by the base station device 71 and the terminal station device 72 at each position where the point cloud data group is acquired. The non-line-of-sight region extraction unit 12 scans a region specified by the radius at each position where the point cloud data group is acquired to detect the point cloud data, and extracts a non-line-of-sight region. The area ratio calculation unit 13 calculates a ratio of a total area of all the extracted non-line-of-sight regions to an area of a region constructed by the first Fresnel zone 33. The received power estimation unit 14 estimates a received power based on the calculated ratio between the areas. The line-of-sight determination unit 15 determines based on the received power whether or not there is a line of sight between the base station device 71 and the terminal station device 72.

As a result, it is possible to estimate the received power by using the point cloud data acquired in the target section such as between the base station device 71 and the terminal station device 72. Then, it is possible to easily grasp the radio wave propagation environment by determining whether or not there is a line of sight based on the estimated received power. Therefore, the method according to the first embodiment makes it possible to grasp the radio wave propagation environment with a less amount of calculation as compared with an analysis method of performing a simulation on a wide area, such as a ray tracing method, which has been implemented in a conventional station installation design applied to a mobile wireless communication system or the like. In other words, the station installation design device 1 according to the first embodiment is applicable to millimeter-wave wireless communication systems, and makes it possible to easily grasp the radio wave propagation environment and reduce the amount of calculation.

In addition, in the first embodiment, the amount of calculation is further reduced by excluding the region corresponding to the non-line-of-sight region already extracted at another position from the region specified by the radius of the first Fresnel zone 33. As a result, it is possible to determine whether or not there is a line of sight based on the estimated received power while further reducing the amount of calculation, and to present the installation position of the base station device 71.

Note that in the first embodiment described above, when obtaining the region 40-3 in FIG. 2, for example, the scanning target exclusion region calculation unit 122 reduces the region 40-2 to obtain the region 40-3 based on the ratio between the radius $r_2$ and the radius $r_3$. Also, when obtaining the region 40a-3 in FIG. 8, for example, the scanning target exclusion region calculation unit 122 reduces the region 40a-2 to obtain the region 40a-3 based on the ratio between the radius $r_2$ and the radius $r_3$. However, the configuration of the present invention is not limited to that embodiment. When the region 40-3 and the region 40a-3 are obtained, the region 40-1 and the region 40a-1 may be enlarged or reduced based on the ratio between the radius $r_1$ and the radius $r_3$ to obtain the region 40-3 and the region 40a-3.

Further, in the first embodiment described above, the area of the region constructed by the first Fresnel zone 33 is the area of the region specified by the radius rm of the first Fresnel zone 33 at the position of the last point cloud data group, but the configuration of the present invention is not limited to that embodiment.

The area of the region constructed by the first Fresnel zone 33 is not limited to that at the position of the last point cloud data group, and may be the area of a region specified by a radius at a freely selected position. However, in this case, the area ratio calculation unit 13 needs to calculate the area of the region specified by the radius at the selected position. Next, the area ratio calculation unit 13 needs to enlarge or reduce all the non-line-of-sight regions at the other positions according to the radius at the selected position, and further add the non-line-of-sight region at the selected position to calculate the total area of the non-line-of-sight regions at the selected position.

Further, in the first embodiment described above, the received power calculated by the received power estimation unit 14 in the example illustrated in FIG. 9 is calculated based on a non-line-of-sight region when the base station device 71 is viewed from the terminal station device 72 side, and is thus the received power of the terminal station device 72. However, even if the non-line-of-sight region is calculated when the terminal station device 72 is viewed from the base station device 71 so as to go back to the second and first point cloud data groups from the third point cloud data group, the area ratio is the same. Accordingly, the received power calculated by the received power estimation unit 14 is also the received power of the base station device 71.

Further, in the first embodiment described above, the non-line-of-sight region extraction unit 12 sets, as the exclusion region, the newly detected non-line-of-sight region at the previous position and the region already excluded from the scanning target region, excludes the exclusion region from the scanning region, and then scans the point clouds. However, the configuration of the present invention is not limited to that embodiment. The non-line-of-sight region extraction unit 12 may not include the scanning target exclusion region calculation unit 122 and the scanning processing unit 121 may scan the entire area specified by the radius at each of all the positions.

Second Embodiment

Figure 10:
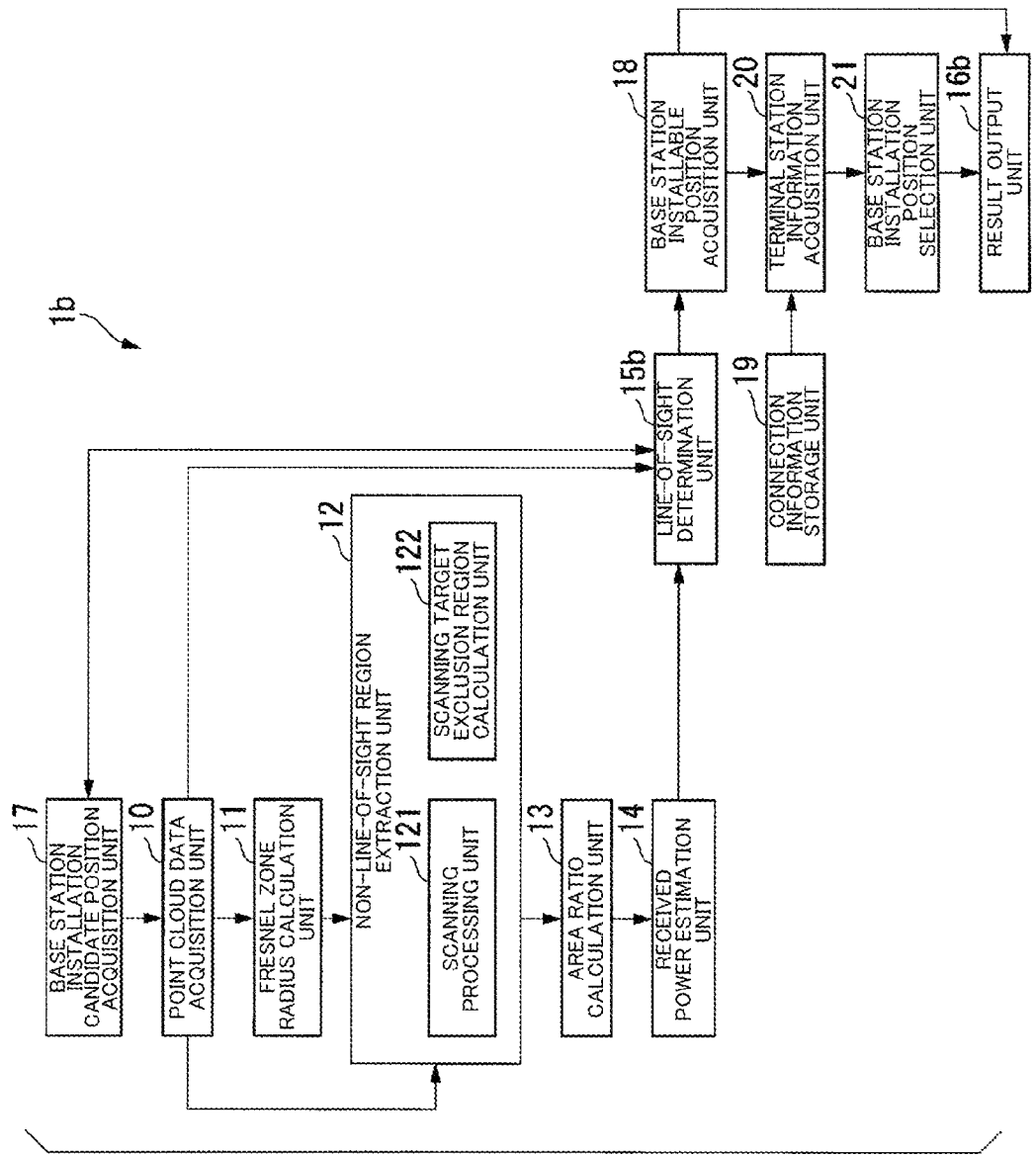
FIG. 10 is a block diagram illustrating a configuration of a station installation design device according to a second embodiment.

FIG. 10 is a block diagram illustrating a configuration of a station installation design device 1b according to a second embodiment.

In the second embodiment, the same constituents as those in the first embodiment are designated by the same reference numerals, and different constituents will be described below. As described in the first embodiment, the millimeter-wave wireless communication system has the feature that both the base station device 71 and the terminal station device 72 are fixedly installed.

Thus, if the base station device 71 fails, the terminal station device 72 connected to the base station device 71 may be isolated. In order to avoid such isolation, it is desirable to prepare another base station device 71 as an alternative connection destination.

The station installation design device 1b includes the point cloud data acquisition unit 10, the Fresnel zone radius calculation unit 11, the non-line-of-sight region extraction unit 12, the area ratio calculation unit 13, the received power estimation unit 14, a line-of-sight determination unit 15b, a result output unit 16b, a base station installation candidate position acquisition unit 17, a base station installable position acquisition unit 18, a connection information storage unit 19, a terminal station information acquisition unit 20, and a base station installation position selection unit 21.

The base station installation candidate position acquisition unit 17 uses map information or the like to acquire a candidate for a position where the base station device 71 is to be installed (hereinafter, referred to as a "base station installation candidate position"). Note that the base station installation candidate position that is a candidate for installing the base station device 71 is a fixed position such as a utility pole or other pole. Accordingly, a plurality of positions are determined in advance in the map information, and the base station installation candidate position acquisition unit 17 selects and acquires at least one or more positions as base station installation candidate positions from among the plurality of positions. Further, in the following description, the number of base station installation candidate positions acquired by the base station installation candidate position acquisition unit 17 is represented by "n". Here, n is an integer of 1 or more.

The line-of-sight determination unit 15b determines whether or not processing for all the base station installation candidate positions has been completed, as well as including the configuration of the line-of-sight determination unit 15 of the first embodiment. Also, when the line-of-sight determination unit 15b determines that the processing for all the base station installation candidate positions has been completed, the line-of-sight determination unit 15b outputs the result of the line-of-sight determination for each base station installation candidate position to the base station installable position acquisition unit 18.

The base station installable position acquisition unit 18 selects base station installation candidate positions where there is a line of sight as installable positions (hereinafter, referred to as "base station installable positions") based on the result of the line-of-sight determination output by the line-of-sight determination unit 15b. Also, the base station installable position acquisition unit 18 detects the number of selected base station installable positions. In the following description, the number of base station installable positions detected by the base station installable position acquisition unit 18 is represented by "q".

The connection information storage unit 19 is, for example, a non-volatile storage area, and stores information about terminal stations in advance. For example, as information about terminal stations, the connection information storage unit 19 stores in advance information indicating the number of following terminal stations and information indicating each terminal station for each base station installation candidate position. The "following terminal stations" means terminal stations in each of which there is a line of sight for the base station device 71 when the base station device 71 is installed at the position indicated by a base station installation candidate position, and the terminal station is connectable to the base station device 71 when the terminal station device 72 is installed. Also, the connection information storage unit 19 stores in advance, as information about the terminal stations for each of the pieces of information indicating the terminal stations, information indicating the number of base stations in each of which there is a line of sight for the terminal station device 72 installed in each of the terminal stations and the base station is connectable when the base station device 71 is installed. Note that the information about the terminal stations stored in the connection information storage unit 19 may include a terminal station in which the terminal station device 72 to be the target of the line-of-sight determination is installed.

The terminal station information acquisition unit 20 acquires, based on the base station installable positions acquired by the base station installable position acquisition unit 18, information about terminal stations associated with the base station installable positions from the connection information storage unit 19.

The base station installation position selection unit 21 finally selects a position where the base station device 71 is to be installed based on the information about the terminal station device 72 acquired by the terminal station information acquisition unit 20. The result output unit 16*b* outputs information on the position where the base station device 71 selected by the base station installation position selection unit 21 is to be installed. Also, when the number "q" of base station installable positions acquired by the base station installable position acquisition unit 18 is "0", the result output unit 16*b* outputs information indicating that a base station cannot be installed at any of the base station installation candidate positions.

Figure 11:
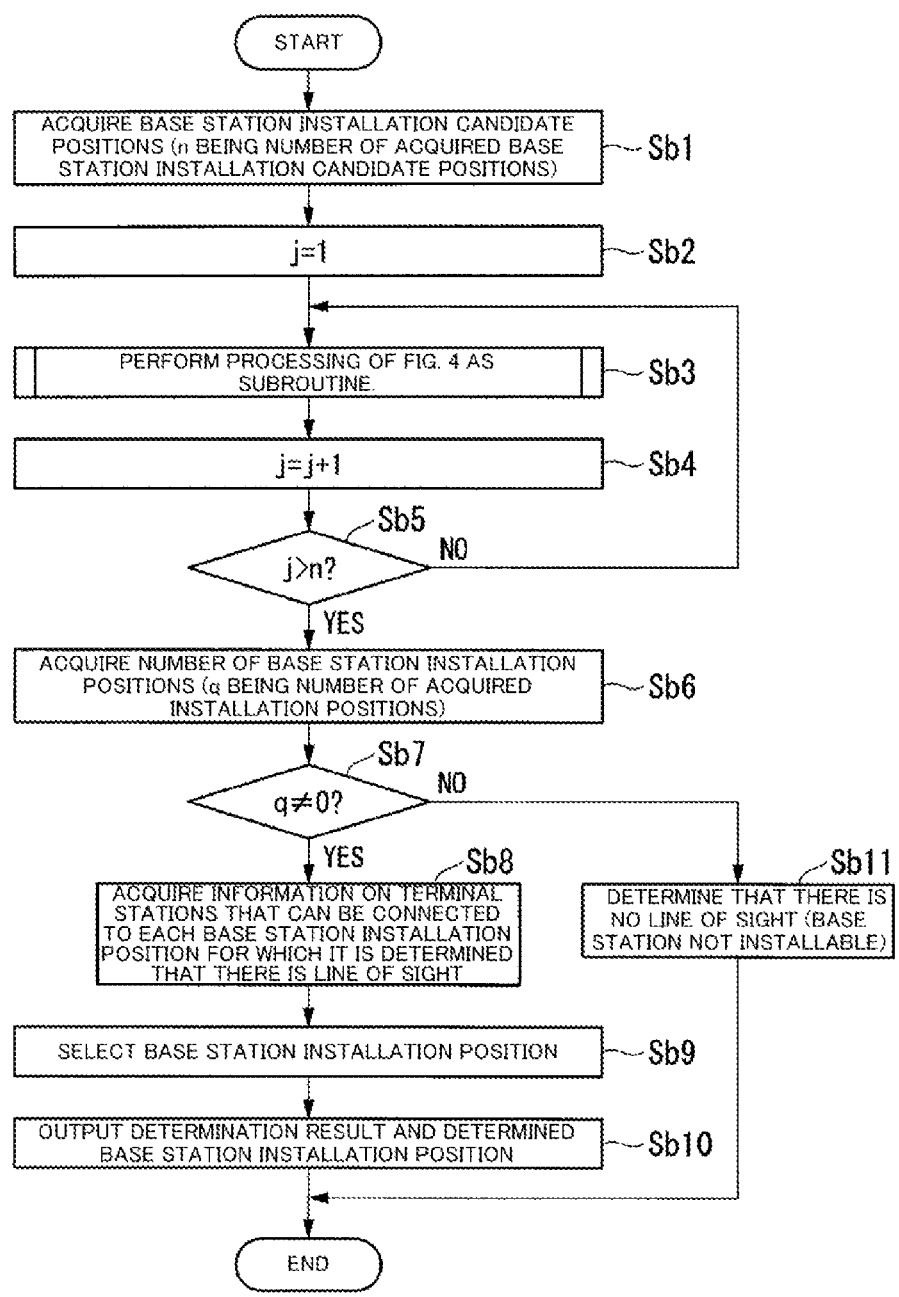
FIG. 11 is a flowchart illustrating a processing flow of a station installation design method according to the second embodiment.

Station Installation Design Method in Station Installation Design Device According to Second Embodiment Next, processing of a station installation design method in the station installation design device 1*b* according to the second embodiment will be described with reference to FIG. 11. Note that it is assumed that before the processing of FIG. 11 is started, position information indicating the position of the terminal station device 72 is given to the station installation design device 1.

The base station installation candidate position acquisition unit 17 selects n base station installation candidate positions from, for example, map information (step Sb1). The base station installation candidate position acquisition unit 17 sets "1" to an internal counter "j", and the base station installation candidate position acquisition unit 17 selects any one of the acquired base station installation candidate positions, and outputs the selected one to the point cloud data acquisition unit 10 (step Sb2).

When the point cloud data acquisition unit 10 receives the base station installation candidate position from the base station installation candidate position acquisition unit 17, the point cloud data acquisition unit 10 sets the base station installation candidate position as a position where the base station device 71 is to be installed. The point cloud data acquisition unit 10, the Fresnel zone radius calculation unit 11, the non-line-of-sight region extraction unit 12, the area ratio calculation unit 13, the received power estimation unit 14, and the line-of-sight determination unit 15*b* starts the processing of steps Sa1 to Sa12 of the first embodiment illustrated in FIG. 4 as a subroutine (step Sb3).

Note that, in step Sa11 and step Sa12 in the processing illustrated in FIG. 4, information indicating whether or not a base station can be installed based on the determination result from the line-of-sight determination unit 15 is output in response to receiving the determination result from the line-of-sight determination unit 15. On the other hand, in step Sa11 and step Sa12 in step Sb3 of the second embodiment, instead, processing is performed in which the result output unit 16*b* does not output such information, and the line-of-sight determination unit 15*b* associates the determination result with the base station installation candidate position and stores them in the internal storage area. Further, the final processing in FIG. 4 is not end processing but "Return" processing that exits the subroutine.

When the line-of-sight determination unit 15*b* completes the line-of-sight determination between the base station installation candidate position provided to the point cloud data acquisition unit 10 by the base station installation candidate position acquisition unit 17 and the terminal station device 72, the line-of-sight determination unit 15*b* outputs information indicating that completion to the base station installation candidate position acquisition unit 17. In response to receiving the information indicating the completion, the base station installation candidate position acquisition unit 17 sets a value obtained by adding "1" to the internal counter "j" to "j" (step Sb4).

The base station installation candidate position acquisition unit 17 determines whether or not j is larger than n (step Sb5). When the base station installation candidate position acquisition unit 17 determines that j is equal to or smaller than n (step Sb5, No), the processing returns to step Sb3. Accordingly, the base station installation candidate position acquisition unit 17 selects any one of the unprocessed base station installation candidate positions from among the acquired base station installation candidate positions, and outputs the selected one to the point cloud data acquisition unit 10. As a result, the processing of step Sb3 is repeated the number of base station installation candidate positions, that is, "n" times.

On the other hand, when the base station installation candidate position acquisition unit 17 determines that j is larger than n (step Sb5, Yes), the base station installation candidate position acquisition unit 17 outputs information indicating an instruction to output the determination result to the line-of-sight determination unit 15*b*. In response to receiving the information indicating the output instruction from the base station installation candidate position acquisition unit 17, the line-of-sight determination unit 15*b* outputs the determination result for each base station installation candidate position stored in the internal storage area to the base station installable position acquisition unit 18.

Based on the result of the line-of-sight determination output by the line-of-sight determination unit 15*b*, the base station installable position acquisition unit 18 acquires all the base station installation candidate positions for which it is determined that there is a line of sight as base station installable positions, and further detects the number "q" of base station installable positions (step Sb6). The base station installable position acquisition unit 18 determines whether or not the value of "q" is "0" (step Sb7).

When the base station installable position acquisition unit 18 determines that the value of "q" is "0" (step Sb7, No), the result output unit 16*b* outputs the following information (step Sb11), and then the processing ends. The "following information" means information indicating that the estimated received power is smaller than the specified minimum received power for all the base station installation candidate positions, and there is no line of sight, that is, any base station cannot be installed.

On the other hand, when the base station installable position acquisition unit 18 determines that the value of "q" is not "0" (step Sb7, Yes), the base station installable position acquisition unit 18 outputs information on all the acquired base station installable positions to the terminal station information acquisition unit 20. The terminal station information acquisition unit 20 acquires, based on the base station installable positions received from the base station installable position acquisition unit 18, information about terminal stations associated with the base station installable positions from the connection information storage unit 19. The terminal station information acquisition unit 20 outputs the acquired information about terminal stations to the base station installation position selection unit 21 (step Sb8).

The base station installation position selection unit 21 finally selects a base station installation position where the base station device 71 is to be installed based on the information about terminal stations received from the terminal station information acquisition unit 20 (step Sb9).

The conditions for how the base station installation position selection unit 21 selects the final base station installation position are determined as appropriate. For example, now suppose that the terminal station device 72, which is the target of the line-of-sight determination, cannot be connected to the base station device 71 as referred to the information stored in the connection information storage unit 19. In this case, when the base station installation position selection unit 21 selects positions for at least two base station installations 71 to which the terminal station device 72 which is the target of the line-of-sight destination can be connected, a base station device 71 can be ensured as an alternative connection destination.

Further, now suppose that the terminal station device 72, which is the target of the line-of-sight determination, can already be connected to one base station device 71 as referred to the information stored in the connection information storage unit 19. In this case, when the base station installation position selection unit 21 selects one base station installation position to which the terminal station device 72 which is the target of the line-of-sight destination can be connected, a base station device 71 can be ensured as an alternative connection destination.

Further, in addition to the selection of the base station installation position as described above, the base station installation position selection unit 21 may select, for example, a position to which the terminal station device 72 having the smallest number of connectable base stations is connected as a base station installation position. Further, the base station installation position selection unit 21 may select, for example, a position that can be connected to the most terminal station devices 72 as a base station installation position. Such selection makes it possible to set other terminal station devices 72 to be a state of having a line of sight with many base station devices 71 in advance, that is, to be connectable to the terminal station devices 72 when the processing illustrated in FIG. 11 is performed.

The base station installation position selection unit 21 outputs information on the selected base station installation position to the result output unit 16b. The result output unit 16b outputs the information on the base station installation position received from the base station installation position selection unit 21 together with the information indicating that there is a line of sight, that is, a base station can be installed (step Sb10).

Note that for q=1, that is, when there is only one base station installable position and the terminal station device 72 which is the target of the line-of-sight determination cannot be connected to a base station, a plurality of base station installation positions cannot be assigned to the terminal station device 72 which is the target of the line-of-sight determination. In this case, the user needs to refer to the information output by the result output unit 16b and performs station installation design such that an alternative connection destination can be secured again.

According to the second embodiment described above, the station installation design device 1b performs the line-of-sight determination in the configuration of the first embodiment for a plurality of base station installation candidate positions, and sets a base station installation candidate position for which it is determined that there is a line of sight as a base station installable position. Then, the station installation design device lb selects a base station installation position from among the base station installable positions based on information about terminal stations associated with the base station installable positions. Thus, it is possible to provide station installation design in consideration of a line of sight, that is, the number of base station devices 71 that can secure a connection. In the millimeter-wave wireless communication system, a terminal station device 72 is also fixedly installed, and therefore, when the base station device 71 fails, another base station device 71 as an alternative connection destination is required so that the terminal station device 72 is not isolated. On the other hand, applying the station installation design device lb according to the second embodiment described above provides station installation design such that a terminal station device 72 can be connected to a plurality of base station devices 71. Therefore, in the second embodiment, in addition to having the advantageous effects obtained from the configuration of the first embodiment, it is possible to enhance the continuity of communication when the base station device 71 fails, and to provide station installation design for high fault tolerance.

Note that in the configuration of the second embodiment described above, the connection information storage unit 19 stores the information about the terminal station device 72 in advance, but the configuration of the present invention is not limited to that embodiment. For example, for a plurality of terminal station devices 72, information indicating the relationship between base station installation positions obtained by repeating the processing of FIG. 11 and the terminal station may be stored in the connection information storage unit 19, and the stored information may be used in the processing of step Sb9.

Third Embodiment

Figure 12:
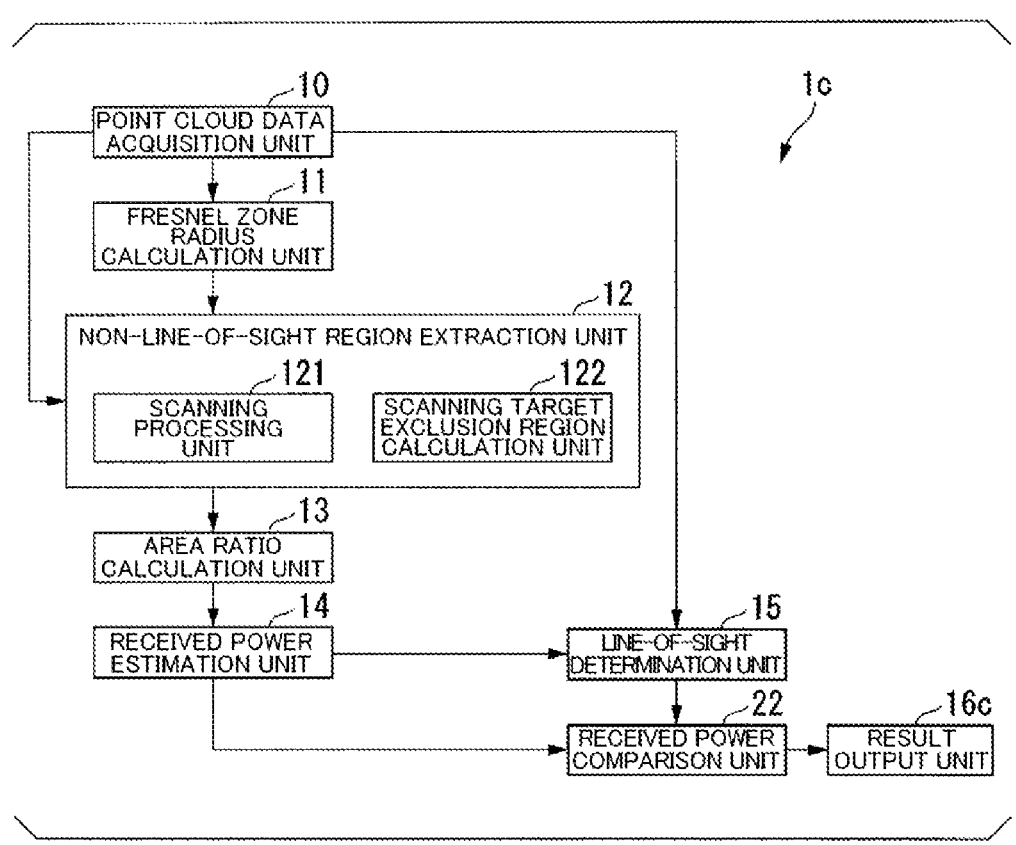
FIG. 12 is a block diagram illustrating a configuration of a station installation design device according to a third embodiment.

FIG. 12 is a block diagram illustrating a configuration of a station installation design device 1c according to a third embodiment.

In the third embodiment, the same constituents as those in the first embodiment are designated by the same reference numerals, and different constituents will be described below. As described in the first embodiment, the millimeter-wave wireless communication system has the feature that both the base station device 71 and the terminal station device 72 are fixedly installed.

When they are fixedly installed, the amount of received power of the radio waves received by the base station device 71 or the terminal station device 72 may also be fixed. In that case, if the base station device 71 or the terminal station device 72 receives an excessive input for receiving a radio wave of excessive power, the operation of the device becomes unstable, and thus communication may not be possible. In order to prevent such an excessive input, it is desirable to set some restrictions on the received power.

The station installation design device 1c includes the point cloud data acquisition unit 10, the Fresnel zone radius calculation unit 11, the non-line-of-sight region extraction unit 12, the area ratio calculation unit 13, the received power estimation unit 14, the line-of-sight determination unit 15, a result output unit 16c, and a received power comparison unit 22.

When the line-of-sight determination unit 15 determines that there is a line of sight, the received power comparison unit 22 determines whether or not an excessive input is likely to occur by comparing the received power estimated by the received power estimation unit 14 with an allowable maximum received power which is a predetermined threshold value. The result output unit 16c outputs information indicating whether or not the base station can be installed based on the comparison result from the received power comparison unit 22.

Station Installation Design Method in Station Installation Design Device According to Third Embodiment Next, processing of a station installation design method in the station installation design device 1c according to the third embodiment will be described with reference to FIG. 13. Note that it is assumed that before the processing illustrated in FIG. 13 is started, position information indicating the position of the base station device 71 and position information indicating the position of the terminal station device 72 are given to the station installation design device 1c.

Figure 13:
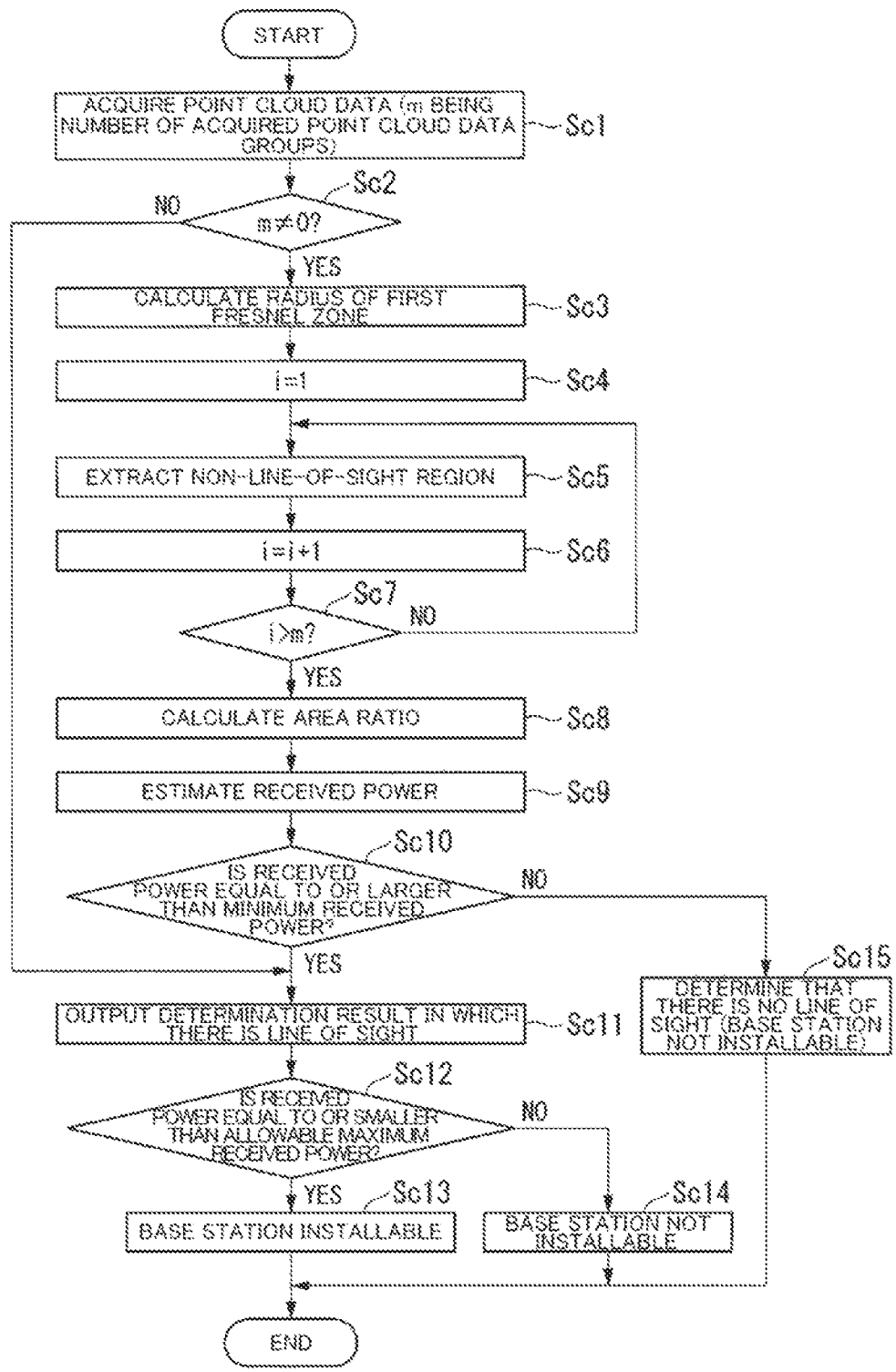
FIG. 13 is a flowchart illustrating a processing flow of a station installation design method according to the third embodiment.

The processing of steps Sc1 to Sc10 illustrated in FIG. 13 is the same as the processing of steps Sa1 to Sa10 of the station installation design method according to the first embodiment illustrated in FIG. 4. Note that in step Sc9, the received power estimation unit 14 performs processing of outputting the calculated received power to the received power comparison unit 22 as well as the processing of step Sa9. Further, in step Sc15 of FIG. 13, the result output unit 16c performs the same processing as the processing performed by the result output unit 16 in step Sa12 of FIG. 4. Hereinafter, the processing of steps Sc11 to Sc14, which are different from those of the first embodiment, will be described.

When the line-of-sight determination unit 15 determines in step Sc10 that the received power is equal to or higher than the minimum received power (step Sc10, Yes), the line-of-sight determination unit 15 outputs the determination result in which there is a line of sight to the received power comparison unit 22 (step Sc11). The received power comparison unit 22 compares the received power received from the received power estimation unit 14 when the determination result in which there is a line of sight is received with the predetermined allowable maximum power, to determine whether or not the received power is equal to or smaller than the allowable maximum power (step Sc12).

When the received power comparison unit 22 determines that the received power is equal to or smaller than the allowable maximum power (step Sc12, Yes), the result output unit 16c determines that an excessive input is not likely to occur, and accordingly outputs information indicating that a base station can be installed (step Sc13). On the other hand, when the received power comparison unit 22 determines that the received power exceeds the allowable maximum power (step Sc12, No), the result output unit 16c determines that an excessive input is likely to occur, and accordingly outputs information indicating that any base station cannot be installed (step Sc14).

According to the configuration of the third embodiment described above, when the station installation design device 1c determines that there is a line of sight, the station installation design device 1c determines whether or not the base station device 71 can be installed based on the received power and the predetermined allowable maximum received power. Thus, it is possible to perform station installation design on the condition that the received power is equal to or smaller than the allowable maximum received power. In the millimeter-wave wireless communication system, the terminal station device 72 is also fixedly installed, and therefore, when the base station device 71 or the terminal station device 72 receives a radio wave of excessive power, the operation of the device becomes unstable and accordingly communication may not be performed. On the other hand, applying the station installation design device 1c according to the third embodiment makes it possible to prevent an excessive input to the base station device 71 or the terminal station device 72, in addition to having the advantageous effects obtained by the configuration of the first embodiment.

Note that, instead of the received power comparison unit 22 of the third embodiment, a separation distance comparison unit may be provided that compares a distance between the base station device 71 and the terminal station device 72 with a predetermined minimum separation distance. In this case, in the processing of step Sc12, when the distance between the base station device 71 and the terminal station device 72 is, for example, equal to or longer than the minimum separation distance, the separation distance comparison unit determines that the distance is such that an excessive input is not likely to occur (step Sc12, Yes). On the other hand, when the distance between the base station device 71 and the terminal station device 72 is, for example, shorter than the minimum separation distance, the separation distance comparison unit determines that the distance is such that an excessive input is likely to occur (step Sc12, No).

Fourth Embodiment

Figure 14:
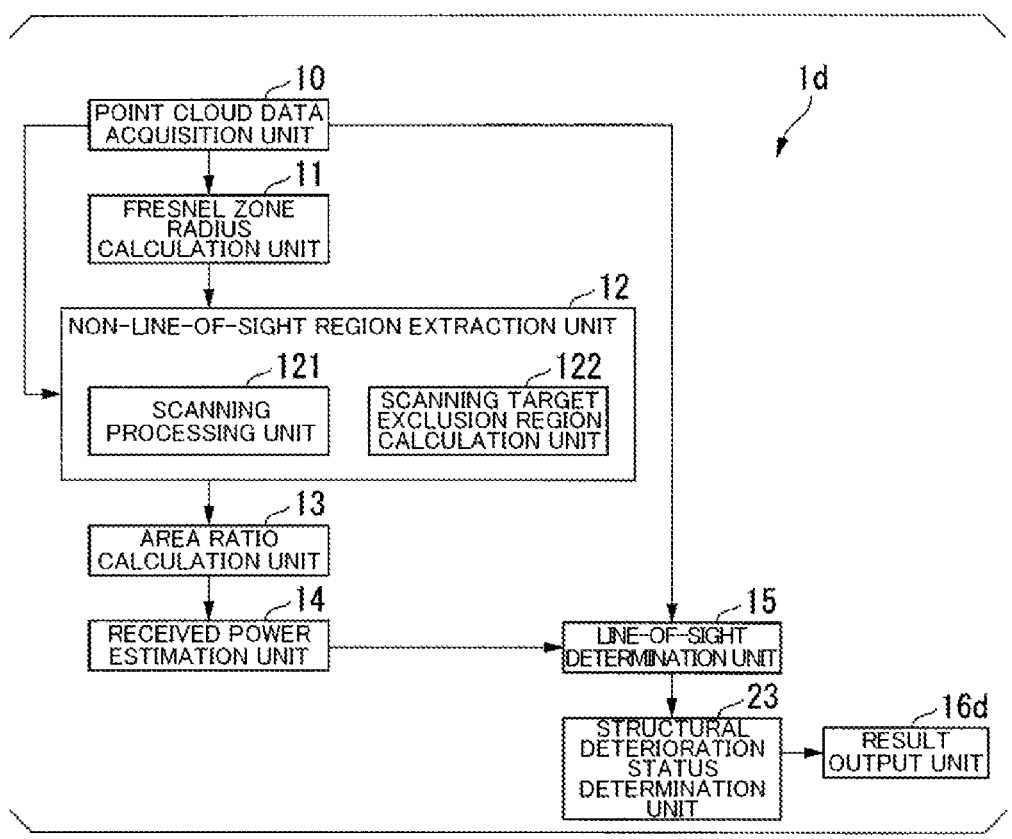
FIG. 14 is a block diagram illustrating a configuration of a station installation design device according to a fourth embodiment.

FIG. 14 is a block diagram illustrating a configuration of a station installation design device 1d according to a fourth embodiment.

In the fourth embodiment, the same constituents as those in the first embodiment are designated by the same reference numerals, and different constituents will be described below. As described in the first embodiment, the millimeter-wave wireless communication system has the feature that both the base station device 71 and the terminal station device 72 are fixedly installed.

Thus, it is necessary to install the base station device 71 on a utility pole, other pole, or the like where any structural deterioration has not occurred.

The station installation design device 1d includes the point cloud data acquisition unit 10, the Fresnel zone radius calculation unit 11, the non-line-of-sight region extraction unit 12, the area ratio calculation unit 13, the received power estimation unit 14, the line-of-sight determination unit 15, a result output unit 16d, and a structural deterioration status determination unit 23.

When the line-of-sight determination unit 15 determines that there is a line of sight, the structural deterioration status determination unit 23 acquires point cloud data at base station installation candidate positions for which it is determined that there is a line of sight from, for example, an MMS, analyzes the acquired data, and determines from the analysis result whether or not there is any structural deterioration. Here, the analysis result is information such as inclination and deflection of utility poles and other poles obtained by analyzing the point cloud data acquired by the structural deterioration status determination unit 23. The structural deterioration status determination unit 23 determines structural deterioration based on the information such as inclination and deflection obtained by the analysis and a predetermined threshold value.

The result output unit 16d outputs information indicating whether or not a base station can be installed based on the structural deterioration determination result from the structural deterioration status determination unit 23.

Station Installation Design Method in Station Installation Design Device According to Fourth Embodiment Next, processing of a station installation design method in the station installation design device 1d according to the fourth embodiment will be described with reference to FIG. 15. Note that it is assumed that before the processing illustrated in FIG. 15 is started, position information indicating the position of the base station device 71 and position information indicating the position of the terminal station device 72 are given to the station installation design device 1d.

Figure 15:
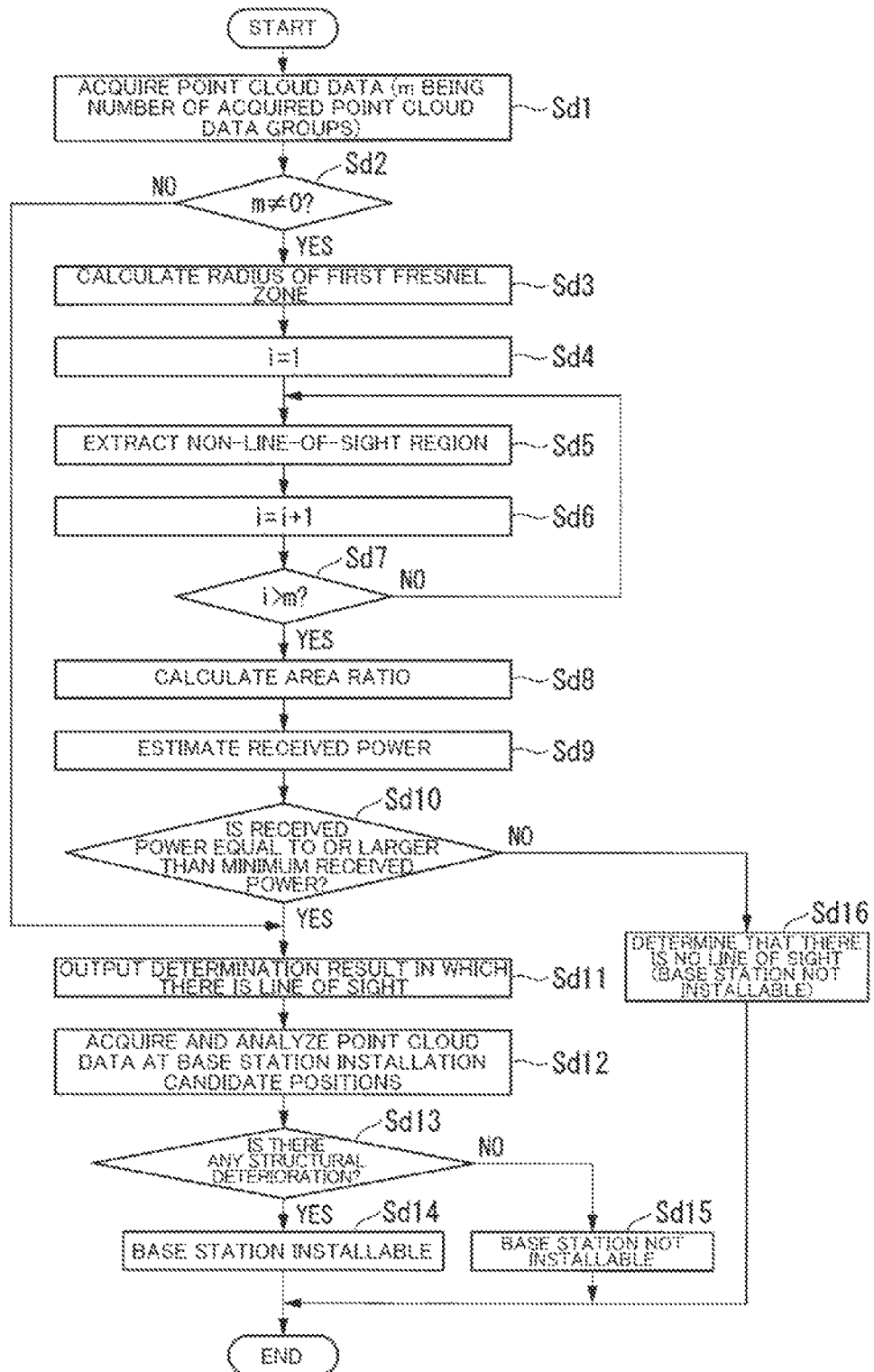
FIG. 15 is a flowchart illustrating a processing flow of a station installation design method according to the fourth embodiment.

The processing of steps Sd1 to Sd10 illustrated in FIG. 15 is the same as the processing of steps Sa1 to Sa10 of the station installation design method according to the first embodiment illustrated in FIG. 4. Note that, in step Sd16 of FIG. 15, the result output unit 16d performs the same processing as the processing performed by the result output unit 16 in step Sa12 of FIG. 4. Hereinafter, the processing of steps Sd11 to Sd15, which are different from those of the first embodiment, will be described.

When the line-of-sight determination unit 15 determines in step Sd10 that the received power is equal to or higher than the minimum received power (step Sd10, Yes), the line-of-sight determination unit 15 outputs the determination result in which there is a line of sight to the structural deterioration status determination unit 23 (Step Sd11). In response to receiving the determination result in which there is a line of sight, the structural deterioration status determination unit 23 acquires the point cloud data at the base station installation candidate positions for which it is determined that there is a line of sight from the MMS or the like, and analyzes the acquire data (step Sd12).

The structural deterioration status determination unit 23 determines whether or not structural deterioration occurs based on information such as inclination and deflection of utility poles and other poles and predetermined thresholds value corresponding to the respective pieces of information (step Sd13). When the structural deterioration status determination unit 23 determines that there is no structural deterioration (step Sd13, Yes), the result output unit 16c outputs information indicating that a base station can be installed (step Sd14). On the other hand, when the structural deterioration status determination unit 23 determines that there is any structural deterioration (step Sc13, No), the result output unit 16c outputs information indicating that any base station cannot be installed (step Sd15).

According to the configuration of the fourth embodiment described above, when the station installation design device 1d determines that there is a line of sight, the station installation design device 1d acquires point cloud data at candidate positions where the base station device 71 is to be installed, and determines based on the acquired point cloud data whether or not the structure at the candidate position where the base station device 71 is to be installed has deteriorated. Accordingly, it is possible to indicate whether or not a base station can be installed based on the structural deterioration status at the base station installation candidate position. Therefore, applying the station installation design device 1d according to the fourth embodiment makes it possible to install the base station device 71 at a position where the structure is stronger, in addition to having the advantageous effects obtained by the configuration of the first embodiment.

Note that the configurations of the second to fourth embodiments may be used in combination.

Further, the method of selecting an installation position for the base station device 71 of the first to fourth embodiments may be applied to the method of selecting an installation position for the terminal station device 72 by reversing the relationship between the base station device 71 and the terminal station device 72.

Further, in the configurations of the above-described embodiments, the processing illustrated in step Sa10 of FIG. 4, steps Sc10 and Sc12 of FIG. 13, and steps Sd10 and Sd13 of FIG. 15 uses an inequality sign to perform the determination processing. However, the present invention is not limited to those embodiments, and the determination processing of "whether or not it is equal to or larger than . . . " and "whether or not it is equal to or smaller than . . . " is only examples, and they may be replaced with, for example, determination processing of "whether or not it exceeds . . . " and "whether or not it is less than . . . ", respectively, depending on how to define their threshold values. Further, the threshold values used for the determination processing are also examples, and they may use different threshold values.

The station installation design devices 1, 1b, 1c, and 1d according to the first to fourth embodiments described above can each be realized by a computer and a program, and the program can be recorded on a recording medium or provided through a network. In other words, a program for implementing the relevant functions may be recorded on a computer-readable recording medium so that the program recorded on the recording medium can be read to be executed by a computer system. Note that the term "computer system" as used herein includes hardware such as an OS and peripheral devices. Further, the "computer-readable recording medium" refers to a portable medium such as a flexible disk, a magneto-optical disk, a ROM, or a CD-ROM, or a storage device such as a hard disk built in the computer system. Further, the "computer-readable recording medium" may include a means that dynamically holds the program for a short period of time, for example, a communication wire for transmitting a program via a network such as the Internet or a communication line such as a telephone line, and in that case, a means that holds the program for a certain period of time, such as a volatile memory built in the computer system that serves as a server or a client. Further, the program describe above may be for implementing a part of the above-mentioned functions, may be for implementing the above-mentioned functions in combination with a program already recorded in the computer system, or may be provided using a programmable logic device such as an FPGA (Field Programmable Gate Array).

Although the embodiments of the present invention are described in detail above with reference to the drawings, the specific configuration is not limited to these embodiments, and design and the like without departing from the spirit and scope of the present invention is also included.

REFERENCE SIGNS LIST

1 Station installation design device
10 Point cloud data acquisition unit
11 Fresnel zone radius calculation unit
12 Non-line-of-sight region extraction unit
13 Area ratio calculation unit
14 Received power estimation unit
15 Line-of-sight determination unit
16 Result output unit

The invention claimed is:

1. A station installation design method comprising: a point cloud data acquisition step of acquiring point cloud data between a base station device and a terminal station device as a point cloud data group; a Fresnel zone radius calculation step of calculating a radius of a first Fresnel zone defined by the base station device and the terminal station device at each position where the point cloud data group is acquired; a non-line-of-sight region extraction step of scanning a region specified by the radius at each position where the point cloud data group is acquired to detect the point cloud data, and extracting a non-line-of-sight region; an area ratio calculation step of calculating a ratio of a total area of all the extracted non-line-of-sight regions to an area of a region constructed by the first Fresnel zone; a received power estimation step of estimating a received power based on the calculated ratio between the areas; and a line-of-sight determination step of determining based on the received power whether or not there is a line of sight between the base station device and the terminal station device.

2. The station installation design method according to claim 1, wherein the non-line-of-sight region extraction step includes, when extracting the non-line-of-sight region at the position where the point cloud data group is acquired, scanning a remaining region in which the region corresponding to the non-line-of-sight region already extracted at another position is excluded from the region specified by the radius corresponding to the position where the point cloud data group is acquired to detect the point cloud data, and extracting the non-line-of-sight region.

3. The station installation design method according to claim 1, comprising: a base station installation candidate position acquisition step of acquiring information on base station installation candidate positions each indicating a candidate for a position where the base station device is to be installed; and performing, for each of the base station installation candidate positions, the point cloud data acquisition step, the Fresnel zone radius calculation step, the non-line-of-sight region extraction step, the area ratio calculation step, the received power estimation step, and the line-of-sight determination step, and the method comprises a selection step of setting as a base station installable position the base station installation candidate position for which it is determined that there is a line of sight, and selecting a base station installation position from among the base station installable positions, based on information about terminal stations associated with the base station installable positions.

4. The stationing design method according to claim 1, comprising a received power comparison step of, when the line-of-sight determination step determines that there is a line of sight, determining whether or not the base station device is installable based on the received power and a predetermined allowable maximum received power.

5. The stationing design method according to claim 1, further comprising a structural deterioration status determination step of, when the line-of-sight determination step determines that there is a line of sight, acquiring the point cloud data at the position where the base station device is to be installed, and determining based on the acquired point cloud data whether or not a structure at the position where the base station device is to be installed is deteriorated.

6. A station installation design device comprising:
a processor; and
a storage medium having computer program instructions stored thereon, when executed by the processor, perform to:
acquires point cloud data between a base station device and a terminal station device as a point cloud data group; calculates a radius of a first Fresnel zone defined by the base station device and the terminal station device at each position where the point cloud data group is acquired; scans a region specified by the radius at each position where the point cloud data group is acquired to detect the point cloud data, and extracts a non-line-of-sight region; calculates a ratio of a total area of all the extracted non-line-of-sight regions to an area of a region constructed by the first Fresnel zone; estimates a received power based on the calculated ratio between the areas; and determines based on the received power whether or not there is a line of sight between the base station device and the terminal station device.

7. The station installation design device according to claim 6, wherein when extracting the non-line-of-sight region at the position where the point cloud data group is acquired, scans a remaining region in which the region corresponding to the non-line-of-sight region already extracted at another position is excluded from the region specified by the radius corresponding to the position where the point cloud data group is acquired to detect the point cloud data, and extracts the non-line-of-sight region.

8. A non-transitory computer-readable medium having computer-executable instructions that, upon execution of the instructions by a processor of a computer, cause the computer to function as the station installation design method according to claim 1.

* * * * *